US012603922B2

(12) United States Patent     (10) Patent No.: US 12,603,922 B2

Bonja et al.     (45) Date of Patent: Apr. 14, 2026

(54) GATEWAY NODE, USER EQUIPMENT AND METHOD FOR ENHANCING A CALL SESSION BETWEEN USER EQUIPMENTS USING A DATA CHANNEL

(71) Applicant: Telefonaktiebolaget LM Ericsson (publ), Stockholm (SE)

(72) Inventors: Mario Bonja, Mirabel (CA); Adithya Lakshminarayanan, Montreal (CA); Rabah Djanati, Laval (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2 days.

(21) Appl. No.: 18/561,026

(22) PCT Filed: May 21, 2021

(86) PCT No.: PCT/SE2021/050482

§ 371 (c)(1),
(2) Date: Nov. 15, 2023

(87) PCT Pub. No.: WO2022/245262

PCT Pub. Date: Nov. 24, 2022

(65) Prior Publication Data

US 2024/0372898 A1     Nov. 7, 2024

(51) Int. Cl.
    *H04L 65/1069*     (2022.01)
    *H04L 65/1016*     (2022.01)
    (Continued)

(52) U.S. Cl.
    CPC ...... *H04L 65/1069* (2013.01); *H04L 65/1016* (2013.01); *H04L 65/1053* (2013.01); *H04L 65/40* (2013.01)

(58) Field of Classification Search
    CPC ............. H04L 65/1069; H04L 65/1016; H04L 65/1053; H04L 65/1089; H04L 65/40;
       (Continued)

(56) References Cited

U.S. PATENT DOCUMENTS 6,259,774 B1 *   7/2001   Miloslavsky ....... H04M 3/5191
                                      348/E7.083
9,667,790 B1    5/2017   Desai
       (Continued)

FOREIGN PATENT DOCUMENTS

WO    WO-2016156256 A1 *   10/2016            H04L 65/103

OTHER PUBLICATIONS

Author Unknown, "Universal Mobile Telecommunications System (UMTS); LTE; 5G; IP Multimedia Subsystem (IMS); Multimedia telephony; Media handling and interaction," Technical Specification 126.114, Version 16.6.1, Sep. 2020, ETSI, 461 pages.
       (Continued)

*Primary Examiner* — Johnny B Aguiar
(74) *Attorney, Agent, or Firm* — Withrow & Terranova, PLLC

(57)            ABSTRACT

A method performed by a gateway node for enhancing a call session between a first User Equipment, UE, and a second UE in a communications network is provided. The second UE is associated to a Private Branch Exchange, PBX, node. When a call session has been established between the first UE and the second UE via the PBX node and via an Internet Protocol Multimedia Subsystem, IMS, network, the gateway node receives, from any one out of the first UE and the second UE, a request for establishing a data channel to enhance the call session. The gateway node negotiates one or more parameters to be used in the requested data channel between the first UE and the second UE. The gateway node establishes the data channel according to the negotiation, to (Continued)

enhance the call session between the first UE and the second UE.

18 Claims, 18 Drawing Sheets

(51) Int. Cl.
    *H04L 65/1053*       (2022.01)
    *H04L 65/40*         (2022.01)

(58) Field of Classification Search
    CPC . H04L 65/401; H04L 65/4015; H04L 65/402;
               H04L 65/4025; H04L 65/403; H04L
             65/4038; H04L 65/4046; H04L 65/4053;
                            H04L 65/4061
    See application file for complete search history.

(56)              References Cited

U.S. PATENT DOCUMENTS

2005/0083909 A1*   4/2005   Kuusinen ............. H04W 76/12
                                       370/395.2

2005/0165719 A1*   7/2005   Greenspan .......... H04L 65/4046
2008/0181201 A1*   7/2008   Park .................... H04L 65/1069
                                       370/352
2014/0106720 A1*   4/2014   Mairs .................. H04M 7/0024
                                       455/415
2014/0233711 A1*   8/2014   Davis .................. H04M 3/4938
                                    379/265.09
2015/0063172 A1*   3/2015   Taylor ................ H04L 65/1046
                                     370/352

OTHER PUBLICATIONS

Rebahi, Yacine et al., "Towards a Next Generation 112 Testbed: The EMYNOS ESInet," International Journal on Critical Infrastructure Protection, vol. 22, Jun. 2018, Elsevier, pp. 39-50.
International Search Report and Written Opinion for International Patent Application No. PCT/SE2021/050482, mailed Feb. 23, 2022, 12 pages.

* cited by examiner

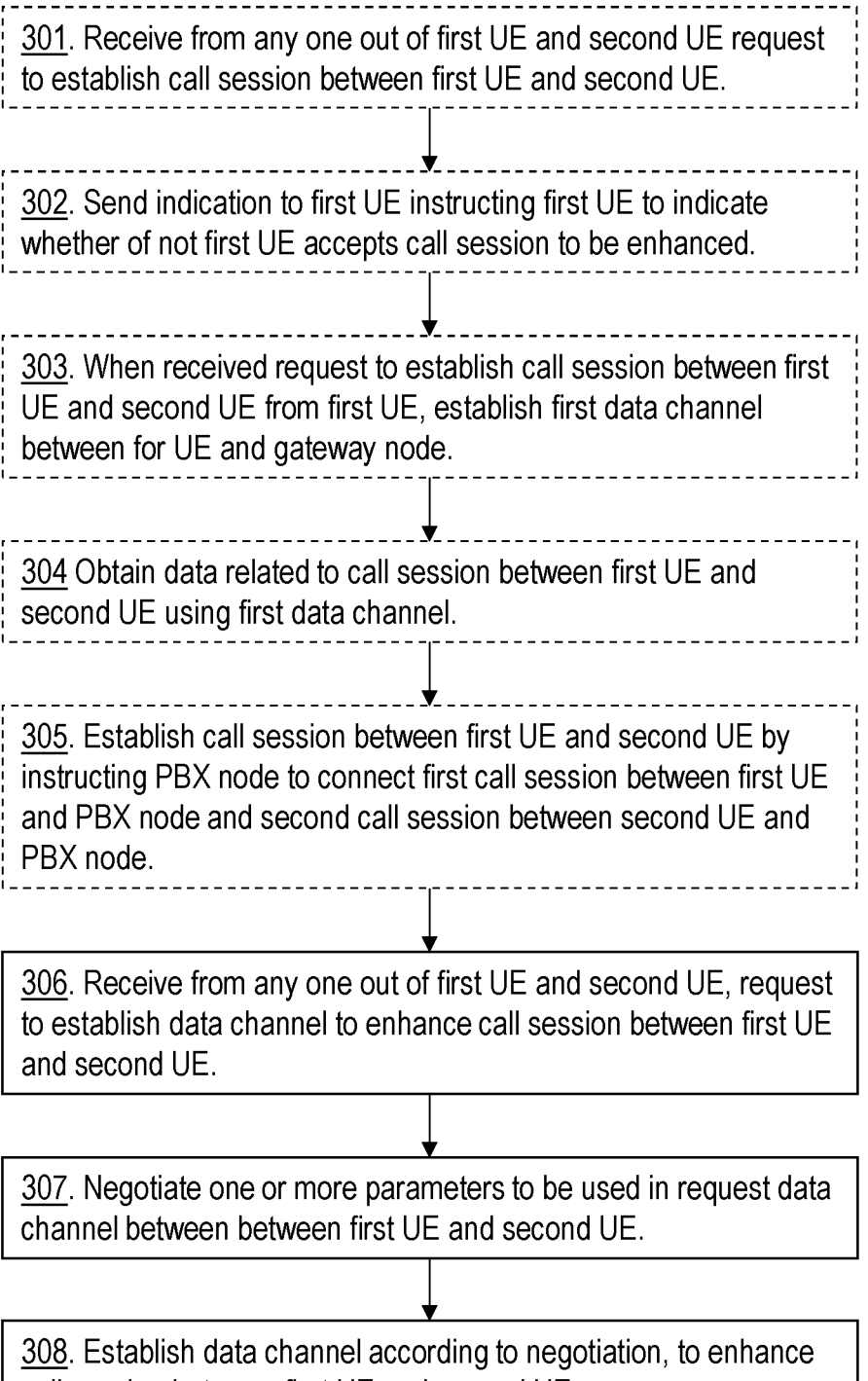

301. Receive from any one out of first UE and second UE request to establish call session between first UE and second UE.

302. Send indication to first UE instructing first UE to indicate whether of not first UE accepts call session to be enhanced.

303. When received request to establish call session between first UE and second UE from first UE, establish first data channel between for UE and gateway node.

304 Obtain data related to call session between first UE and second UE using first data channel.

305. Establish call session between first UE and second UE by instructing PBX node to connect first call session between first UE and PBX node and second call session between second UE and PBX node.

306. Receive from any one out of first UE and second UE, request to establish data channel to enhance call session between first UE and second UE.

307. Negotiate one or more parameters to be used in request data channel between between first UE and second UE.

308. Establish data channel according to negotiation, to enhance call session between first UE and second UE.

Fig. 3

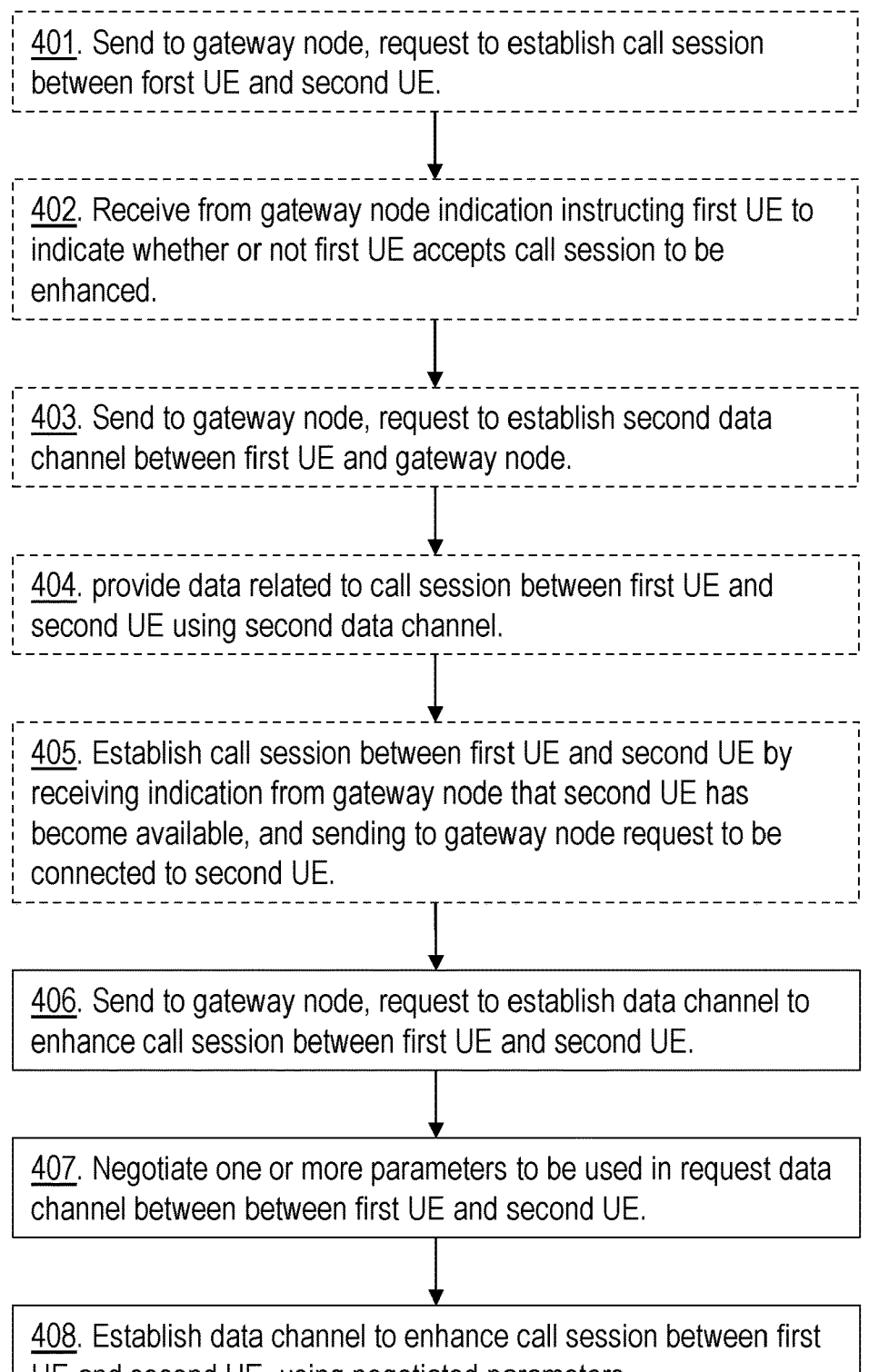

401. Send to gateway node, request to establish call session between forst UE and second UE.

402. Receive from gateway node indication instructing first UE to indicate whether or not first UE accepts call session to be enhanced.

403. Send to gateway node, request to establish second data channel between first UE and gateway node.

404. provide data related to call session between first UE and second UE using second data channel.

405. Establish call session between first UE and second UE by receiving indication from gateway node that second UE has become available, and sending to gateway node request to be connected to second UE.

406. Send to gateway node, request to establish data channel to enhance call session between first UE and second UE.

407. Negotiate one or more parameters to be used in request data channel between between first UE and second UE.

408. Establish data channel to enhance call session between first UE and second UE, using negotiated parameters.

Fig. 4

Computer program 770

Carrier 780

Memory 760

Processor 750

Input/Output Interface 700

Gateway node 110

Receiving Unit 710

Negotiating Unit 720

Establishing Unit 730

Obtaining Unit 740

Gateway node 110

GATEWAY NODE, USER EQUIPMENT AND METHOD FOR ENHANCING A CALL SESSION BETWEEN USER EQUIPMENTS USING A DATA CHANNEL

This application is a 35 U.S.C. § 371 national phase filing of International Application No. PCT/SE2021/050482, filed May 21, 2021, the disclosure of which is incorporated herein by reference in its entirety.

TECHNICAL FIELD

Embodiments herein relate to a gateway node, a User Equipment and methods therein. In some aspects, they relate to enhancing a call session between a first User Equipment and a second User Equipment in a communications network.

BACKGROUND

In a typical wireless communication network, wireless devices, also known as wireless communication devices, mobile stations, stations (STA) and/or User Equipments (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

A legacy Private Branch Exchange (PBX) system is a centralized node in many company networks that deals with communication control logic from within the company and beyond. The PBX is responsible for all the call logic, such as call-waiting, forwarding, routing, etc., for both legs of a typical incoming business call: The call-waiting and subsequent routing to an available agent. A leg when used herein means the communication link between a user, e.g. customer or customer agent, and the PBX. More recent systems have adapted the Session Initiation Protocol (SIP) protocol for Voice over IP (VOIP) capability, allowing it to accept calls from any soft SIP client, e.g. referred to as SIP clients.

More specifically, a PBX acts as a SIP back-to-back user agent (B2BUA), segmenting calls between customers and customer agents, i.e. individuals within a business' branch exchange, into two call legs, a first call leg from the customer to the PBX and a second call leg from the PBX to the customer agent. A customer when used herein means the user calling the company. A customer agent when used herein e.g. means the company employee that will serve the customer. Typically, prior to routing a call to an agent, customers interact with an interactive voice responder by means of Dual-Tone Multi-Frequency (DTMF) tones. Routing decisions are often made after the customer has provided a set of options and some means of identification. Routing and queueing are based on logic residing within a PBX. After customers have responded to an Interactive Voice Response (IVR), they are either typically routed to a customer agent, or some form of automated service. This is when the second call leg is initiated. Once the customer agent has answered, the first call leg and the second call leg are merged by some logic within the PBX. This may e.g. be logic that transcodes voice, mixes media codecs etc. A subsequent interaction with either a customer agent or an automated service is performed over voice, as well as DTMF for the transfer of data from customer to business.

Most of the widely used PBX distributions, provide a Representational State Transfer (REST) interface in order to programmatically control the PBX functions, and allow for creation of customer applications. Such applications may play announcements on an incoming customer call leg, respond to DTMF choices made by an endpoint, merge multiple call legs into a conferencing bridge etc. A REST interface in the context of a PBX therefore enables developers to create custom communication application logic as per their requirements. An example of such a REST interface is the Asterisk Rest Interface (ARI), which provides access and control over all primitive Asterisk objects including channels, bridges, endpoints, and extensions. In fact, of all the PBX distributions available, Asterisk provides a most comprehensive API to create custom applications.

It is also worth noting that this API also allow a PBX to report events to a connected client, typically over WebSocket. A WebSocket is a communication protocol widely supported that allows a peer-to-peer exchange of text or binary data. It is also widely used in conjunction with the HTTP protocol to allow a Web server to send asynchronous data to the connected client. Therefore, as opposed to polling the REST interface for changes in state, the PBX is capable of reporting them as and when they happen.

Additionally, non-standard PBX solutions, also provide multi-language programming interfaces in Java, Perl etc. These APIs act very much like a REST API, providing total control over routing logic and call handling.

It should be noted that while most PBX distributions have a REST interface, it is by no means standardized across these distributions. Hence, the availability of functionality is dictated by how a given distribution implements its core features and abstracts objects.

SUMMARY

As part of developing embodiments herein a problem was identified by the inventor and will first be discussed.

A recent adoption of a data channel in the Internet Protocol Multimedia Subsystem (IMS) media handling and interaction in the 3GPP specification 26.114 allows two UE users to use a UE application during a voice and/or video call. This opens new call interaction possibilities beyond voice and video. Playing games, sharing screen content etc. are now possible.

A problem is that legacy PBXs are lacking crucial functionality to provide enhanced calling features to UEs, both internally and externally. This since they do not support the peer-to-peer application media type used in a typical SIP Session Description Protocol (SDP), only audio and/or video. Even if data channels were to be supported, particular applications that the UEs choose would be very hard to implement within core PBX functionality. This may lead to more complex system implementations, resulting in a decreased flexibility of the wireless communications network.

An object of embodiments herein is to improve the flexibility of a communications network.

According to an aspect of embodiments herein, the object is achieved by a method performed by a gateway node for enhancing a call session between a first User Equipment, UE, and a second UE in a communications network. The second UE is associated to a Private Branch Exchange, PBX, node.

When a call session has been established between the first UE and the second UE via the PBX node and via an Internet Protocol Multimedia Subsystem, IMS, network, the gateway node receives a request from any one out of the first UE and the second UE. The request is for establishing a data channel to enhance the call session.

After negotiating one or more parameters to be used in the requested data channel between the first UE and the second UE, the gateway node establishes the data channel according to the negotiation, to enhance the call session between the first UE and the second UE.

According to an another aspect of embodiments herein, the object is achieved by a method performed by a User Equipment, UE, for enhancing a call session between a first UE and a second UE in a communications network. The second UE is associated to a Private Branch Exchange, PBX, node.

When a call session has been established between the first UE and the second UE via the PBX node and via an Internet Protocol Multimedia Subsystem, IMS, network, the UE sends a request to a gateway node. The request is for establishing a data channel to enhance the call session between the first UE and the second UE.

After negotiating one or more parameters to be used in the requested data channel, the UE establishes the requested data channel to enhance the call session between the first UE and the second UE. This is performed by using the negotiated one or more parameters.

According to an another aspect of embodiments herein, the object is achieved by a gateway node configured to enhance a call session between a first User Equipment, UE, and a second UE in a communications network. The second UE is adapted to be associated to a Private Branch Exchange, PBX, node. The gateway node is further configured to:

When a call session has been established between the first UE and the second UE via the PBX node and via an Internet Protocol Multimedia Subsystem, IMS, network, receive, from any one out of the first UE and the second UE, a request for establishing a data channel to enhance the call session, negotiate one or more parameters adapted to be used in the requested data channel between the first UE and the second UE, and establish the data channel according to the negotiation, to enhance the call session between the first UE and the second UE.

According to an another aspect of embodiments herein, the object is achieved by a User Equipment, UE, configured to enhance a call session between a first UE and a second UE in a communications network. The second UE is associated to a Private Branch Exchange, PBX, node. The UE is further configured to:

When a call session has been established between the first UE and the second UE via the PBX node and via an Internet Protocol Multimedia Subsystem, IMS, network, send to a gateway node, a request for establishing a data channel to enhance the call session between the first UE and the second UE, negotiate one or more parameters adapted to be used in the requested data channel, and establish the requested data channel to enhance the call session between the first UE and the second UE, by using the negotiated one or more parameters.

Thanks to that the gateway node receives the request to establish the data channel when the call session between the first UE and the second UE has been established, it is possible for the gateway node to negotiate one or more parameter related to the requested data channel. The gateway node then establishes the data channel according to the negotiation. In this way an efficient mechanism for enhancing call sessions is achieved.

Embodiments herein bring the advantage of an efficient mechanism for enhancing a call sessions between a first UE and a second UE, where the second UE is associated to a PBX node. This is achieved by making it possible to establish a data channel to, e.g. by negotiating one or more parameters related to the data channel, and enhancing the call session by establishing the data channel according to the negotiation. This results in an improved flexibility in a communications network.

BRIEF DESCRIPTION OF THE DRAWINGS

Examples of embodiments herein are described in more detail with reference to attached drawings in which:

FIG. 3 is a flowchart depicting embodiments of a method in a gateway node.

FIG. 4 is a flowchart depicting embodiments of a method in a UE.

DETAILED DESCRIPTION

As a part of developing embodiments herein a problem was identified by the inventor and will be further discussed below.

Legacy PBXs are lacking crucial functionality to provide enriched calling features to UEs both internally and externally. They do not support the peer-to-peer application media type used in a typical SIP SDP; only audio and/or video. Also, legacy PBX call flows do not support the connection logic between the UE and Data Channel Server (DCS) for providing the application while most of the calls made to businesses must be transferred through an IVR menu to the final UE. Legacy PBXs do not have the flexibility to handle the retrieving and managing of more specific business applications either.

Even if data channels were to be supported, particular business applications that the consumer decides to choose would be very hard to implement within core PBX functionality. Even though applications like queuing are presently available, other company specific applications to be run in e.g. a browser would not be easily implementable within core PBX functionality, as these would need to be fetched from the DCS.

The data channel media types cannot be handled the same way as audio and video, which is done with the PBX acting as a SIP B2B UA, when external UEs are connected to UEs associated to the PBX. Instead, a peer-to-peer data channel connection need to be established directly between UE peers.

Figure 1A:
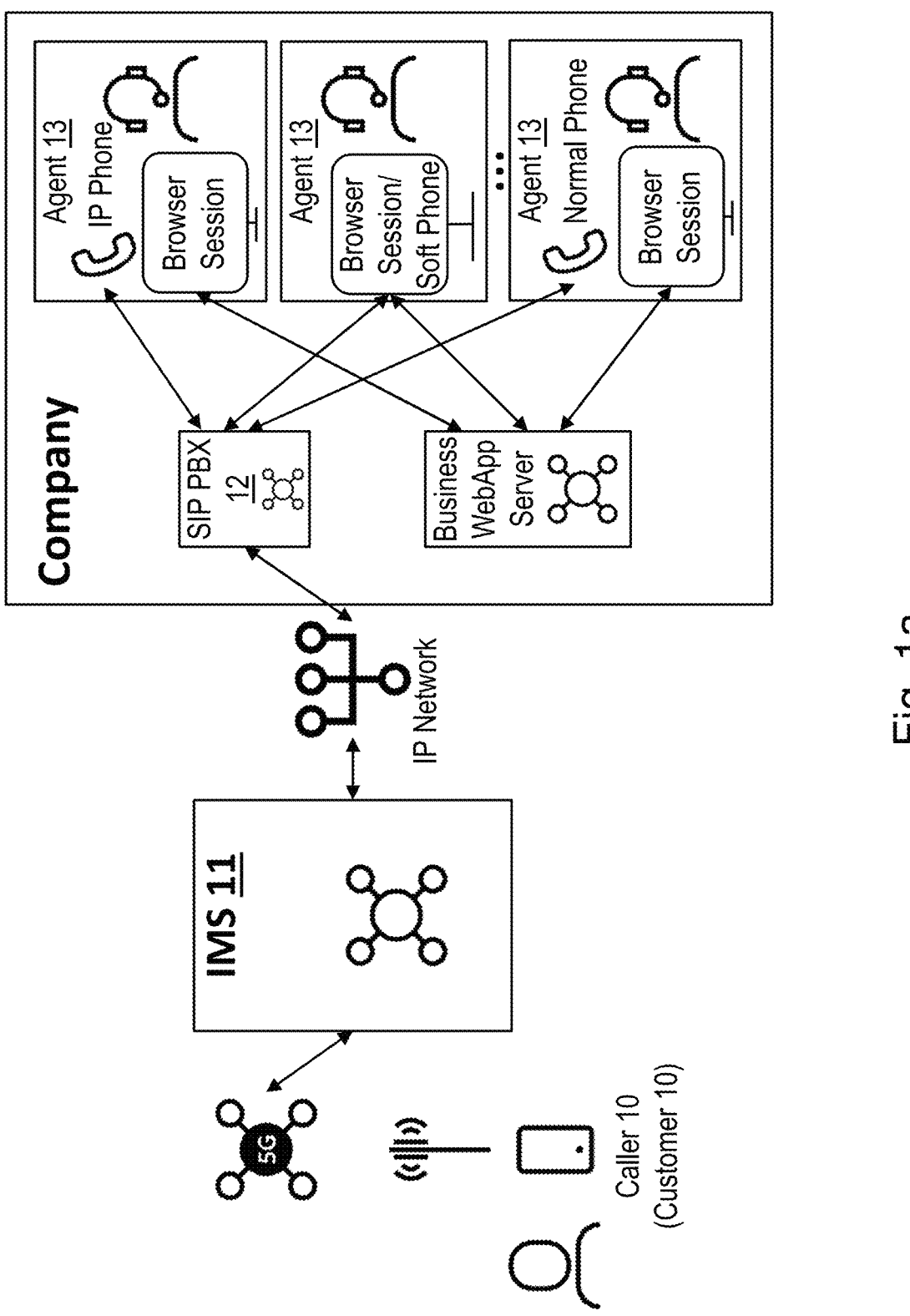
FIG. 1a is a schematic block diagram illustrating embodiments of a according to prior art.

FIG. 1*a* shows a typical scenario when a caller 10 also referred to as customer 10 calls a business, such as a company. An IMS 11 relays the call from the caller 10, to the business' PBX 12 that is SIP-compliant. The PBX 12 answers the call and provides the caller 10 with an IVR menu allowing the caller 10 to make a choice based on the services offered by the company. Based on the caller's 10 choice on the IVR menu, the PBX 12 then relays, or forwards, the call to one of the available agents 13.

In this scenario, the call may either be voice-only or voice and video depending on the customer's 10 UE, the PBX 12 capabilities and the Agent's 13 equipment, e.g. normal phone or PC-based phone with Webcam. The Business WebApp the Agents use is separate from the voice call.

It is also desirable to use such interactivity between external UEs connected to UEs associated to the PBX. However, the new media type, i.e. the IMS data channel media type, used to establish the required connection is not supported in legacy equipment such as PBX, typically used in businesses.

According to some embodiments herein, in the context of Customer to Business Interactive calling, a gateway node such as a Data Channel Server Gateway (DCS GW), allows legacy PBXs to be compliant with Data Channel Media specifications from 3GPP TS26.114 "*IP Multimedia Subsystem (IMS); Multimedia telephony; Media handling and interaction*".

It is possible to deploy embodiments of the gateway node in a remote server, so it doesn't need to be collocated with PBX.

Examples of embodiments herein provide PBXs with enriched, or enhanced, call-waiting and calling features by implementing a gateway node for data channel negotiation between a customer and customer agent, such as a first UE and a second UE.

Examples of embodiments herein enhances the legacy PBX with software that negotiates data channels as received in an SDP offer and/or answer. This software may also be able to fetch and/or run application logic relevant to the given customer, and exchange data over a peer-to-peer data channel with a customer. It is also capable of using data received from a customer to inform how to route and queue the customer in line to the appropriate customer agent. It is also able to exchange and/or forward portions of an SDP relevant to a given customer agent so that peer-to-peer data channels also may be established between a customer and a customer agent, such as the first UE and the second UE.

The data channel may then be used with a browser-based client application to provide the enriched call features.

Some embodiments herein also interact with a PBX by means of a REST interface, in order to control call function, play announcements on a given customer call leg, establish how many business endpoints are available to accept customer calls, subsequently manage how incoming customer calls are queued, create a second call leg between the PBX and the next available agent endpoint, and bridge the two call legs.

The REST interface may also have an event notification channel, typically over WebSocket, thereby notifying the gateway node when a new call has been established with a customer. This allows for the gateway node to associate a given call instance with the PBX's own record of this call instance. Other event notification messages may also point out when a given call instance is hung up, thereby allowing for a graceful hang up on any remaining call legs associated with a call instance. Also, the knowing of when a given endpoint hangs up may assist the gateway node and/or the PBX in maintaining a queue of customers waiting to be connected to the next available agent endpoint.

Given that the different PBX distributions have unique APIs/REST interfaces, interoperability between different distributions will be ensured by implementing a wrapper interface within the gateway node, with plugins for various PBX distributions. The wrapper will therefore provide common functionality between different distributions by calling on a plugin relevant to the distribution's programmable interface.

Embodiments herein may provide at least some of the below advantages:

Costly legacy PBX may still be used with modern enriched or enhanced calling, thus providing them a longer lifespan. The gateway node, along with the proper internal Web infrastructure, are all that is required to add enriched or enhanced calling features to a business', such as a company's, call handling system according to embodiments herein. There will not be any need to upgrade the PBX to support the data channel, also referred to as the IMS data channel. Any type of data may be securely exchanged in real time during the call.

The customer experience is improved by allowing enriched interactivity with a company during a call. This means that the customer may interact with a company in more ways than just voice and video. This opens the possibility for a whole host of applications that can be provided during a call.

Also, the addition of a data channel to an interactive voice responder and legacy PBX, as well as to a customer agent, will allow for a more focused and centralized support experience. Additionally, more sophisticated queuing and/or routing decisions can be made as more sophisticated data may be provided to the company's in an encrypted way.

Low latency requirements are also supported allowing, instead of sending a document over email, a customer to transfer a file within a call.

The company will also benefit from an improved customer support experience, increasing monetization and quality of service.

Figure 1B:
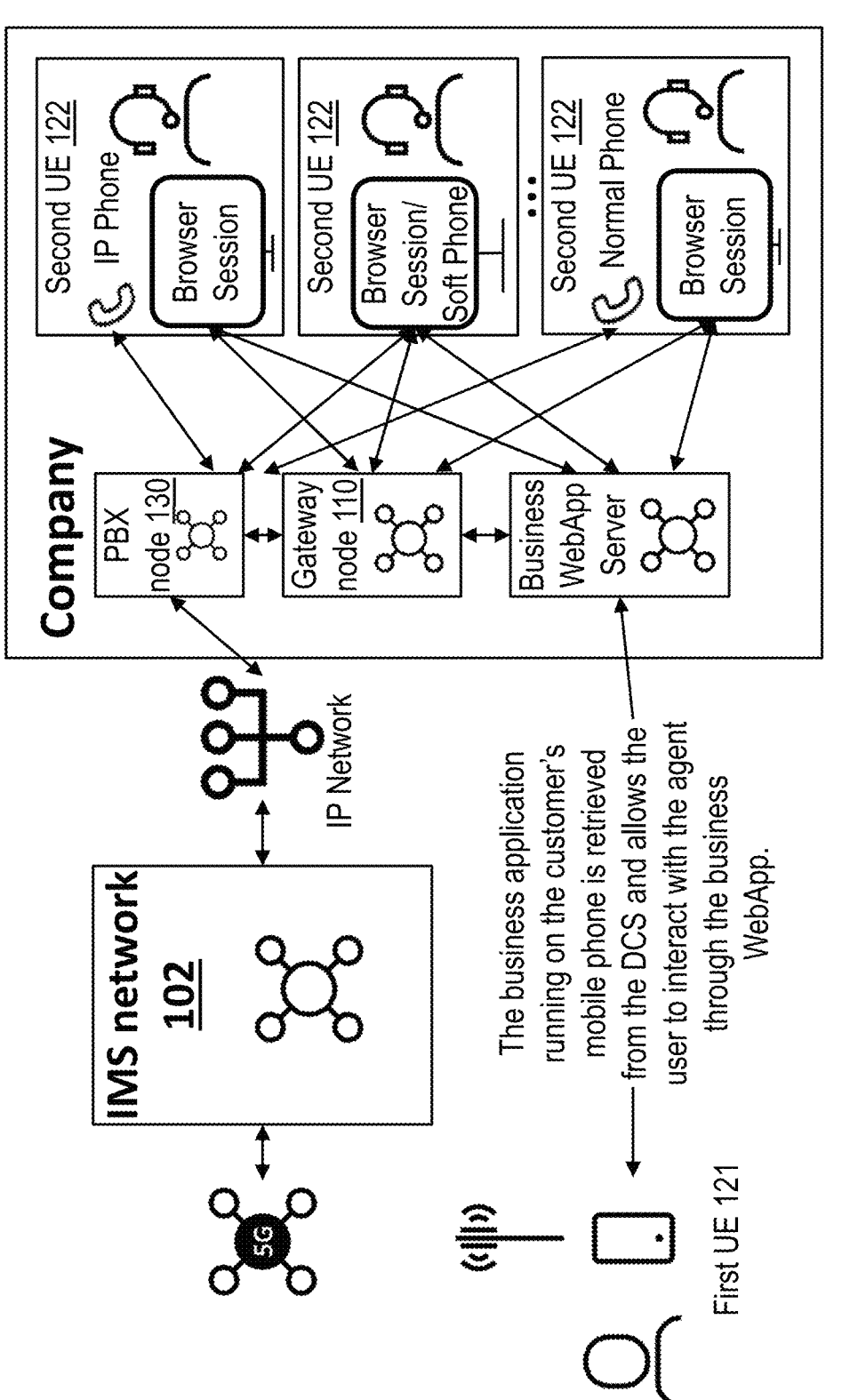
FIG. 1b is a schematic block diagram illustrating example embodiments of an enhanced call session.

FIG. 1b shows a PBX, also referred to as PBX node 130 as shown in FIG. 1a but upgraded according to embodiments herein, to support enriched, or enhanced, calling by adding a gateway node 110 such as a DCS GW in the call path.

In an enriched or enhanced call to a business, such as a company, the caller, referred to as a first UE 121, is presented with an Automatic Landing Page (ALP), such as an ALP application, where the first UE 121 may answer to some questions, such as provide data relevant to a call session, that will allow the transfer to a proper agent. Then, when transferred to an agent, referred to as a second UE 122, a data channel established between the first UE 121 and the second UE 122 may be used to enhance the call, e.g. by enabling the first UE 121 and the second UE 122 exchange data in real-time, such as e.g. by an application running on the first UE 121 and the second UE 122. Note that an application, unlike an IVR, may also be used to enhance calls in the reverse direction when an agent such as the second UE 122 calls a customer such as the first UE 121.

E.g., by placing the gateway node 110 such as the DCS GW between the IMS, referred to as IMS network 102, and the PBX node 130, the gateway node 110 terminates the data channel while allowing the PBX to continue receiving audio and/or video SIP signaling. By positioning the gateway node 110 in this manner, it is also capable of controlling how the PBX node 130 responds to incoming calls, and receives event notifications whenever there is a change of state from the PBX's node 130 perspective.

Figure 2A:
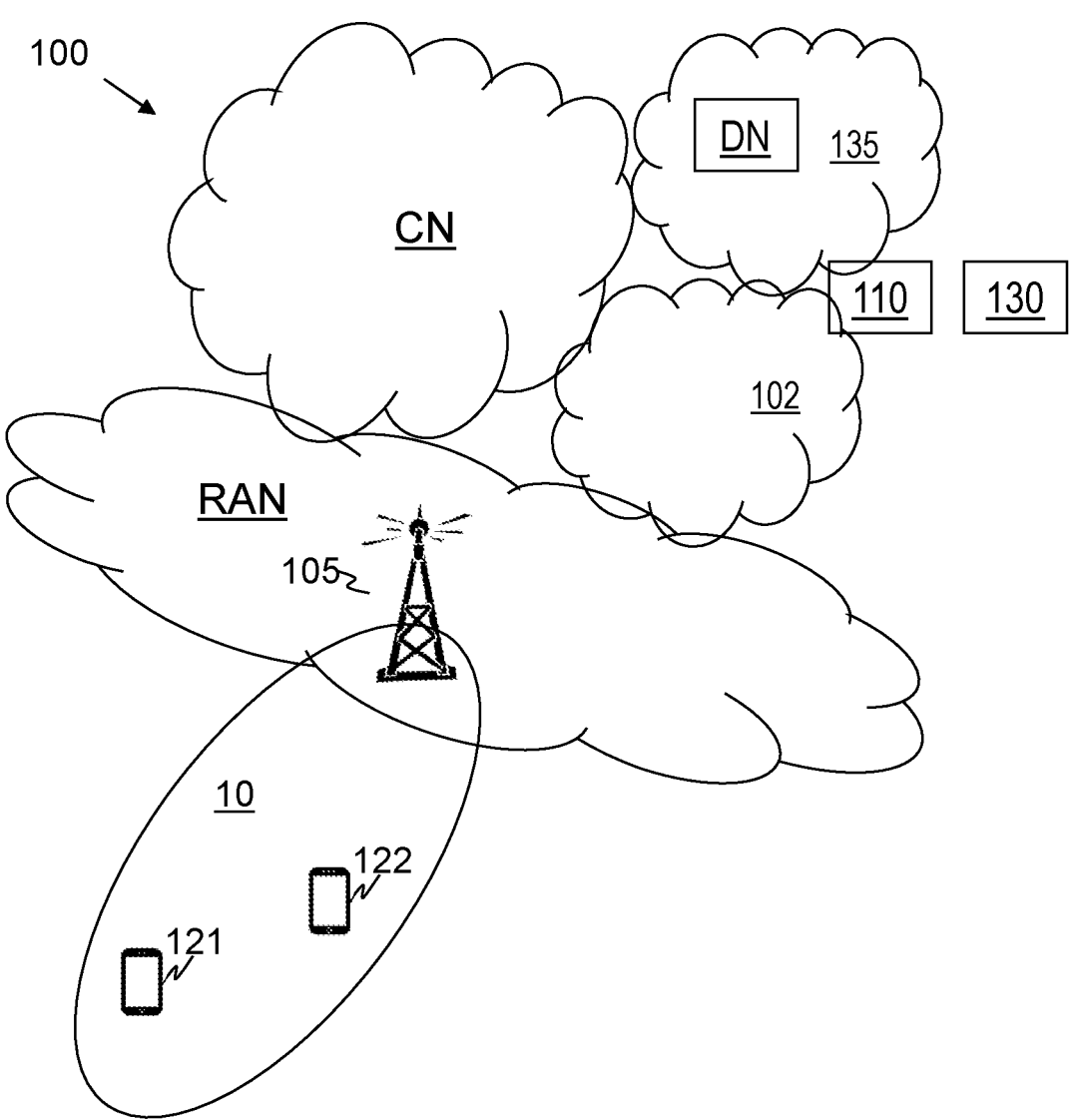
FIG. 2a is a schematic block diagram illustrating example embodiments of a communications network.

FIG. 2a is a schematic overview depicting a communications network 100 wherein embodiments herein may be implemented. The communications network 100 comprises one or more RANs and one or more CNs. The communications network 100 may use 5G NR but may further use a number of other different technologies, such as, Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Ultra Mobile Broadband (UMB), just to mention a few possible implementations.

The communications network 100 further comprises an Internet Protocol (IP) Multimedia Subsystem (IMS) network 102. The IMS network 102 is an architecture for delivering media content over an IP packet switched transport.

A number of network nodes operate in the communications network 100 such as e.g. a network node 105. The network node 105 provides radio coverage in a number of cells which may also be referred to as a beam or a beam group of beams, such as a cell provided by the network node 105.

The network node 105 may be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 105 depending e.g. on the first radio access technology and terminology used. The network node 105 may be referred to as a serving network node and communicates with UEs such as a UE 120, 121, 122, a first UE 121 and a second UE 122, with Downlink (DL) transmissions to the UEs 120, 121, 122 and in Uplink (UL) transmissions from the UEs 120, 121, 122.

One or more UEs such as e.g. UEs 120, 121, 122, operate in the communications network 100. According to example scenarios herein, the UE 121 may be referred to as the first UE 121, and the UE 122 may be referred to as the second UE 122. The UEs 120, 121, 122 may e.g. each be a wireless device, an NR device, a mobile station, a wireless terminal, an NB-IoT device, an MTC device, an eMTC device, a CAT-M device, a WiFi device, an LTE device and an a non-access point (non-AP) STA, a STA, that communicates via one or more Access Networks (AN), e.g. a RAN, to one or more core networks (CN). It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a car or any small base station communicating within a cell.

The gateway node 110 operates in the communications network 100. The gateway node 110 may be a DCS GW. The gateway node 110 may be used for negotiating and establishing data channels for enhancing call sessions between e.g. the first UE 121 and the second UE 122.

The communications network 100 may further comprise a PBX node 130. The PBX node 130 may be a PBX, and may be used for providing functions such as switching, queuing and managing incoming and outgoing call sessions.

Methods according to embodiments herein are performed by the gateway node 110 and the UE 120, 121, 122. These nodes may be Distributed Nodes (DN) s and functionality, e.g. comprised in a cloud 135 as shown in FIG. 1 may be used for performing or partly performing the methods.

Figure 2B:
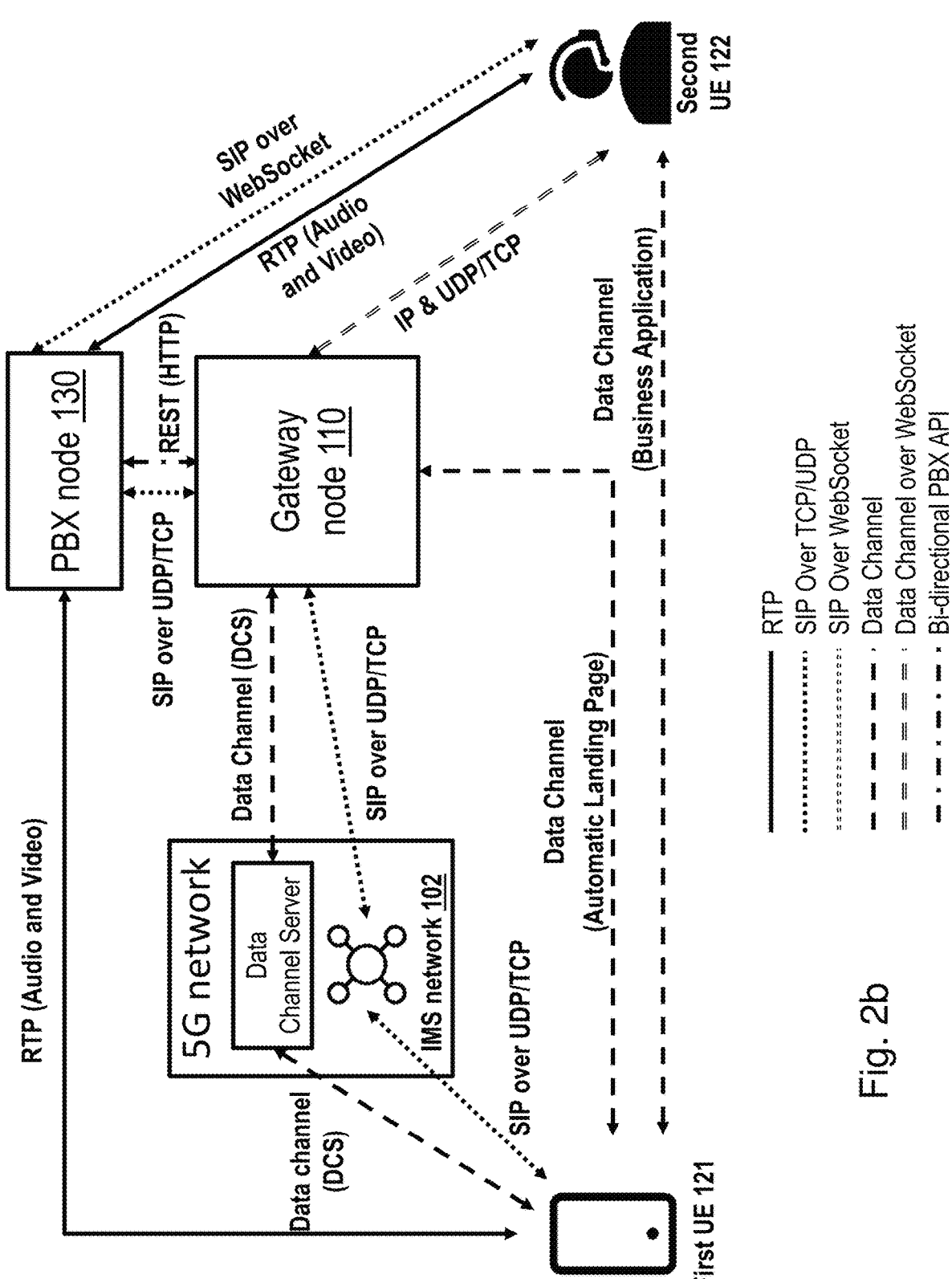
FIG. 2b is a schematic block diagram illustrating example embodiments of a communications network.

FIG. 2b shows a schematic overview of a communications network according to an example scenario wherein embodiments herein may be applied. Communication is performed over different protocols, such as SIP, Transmission Control Protocol (TCP), User Datagram Protocol (UDP), Internet Protocol (IP), Real Time Protocol (RTP) and WebSocket. The communications network comprises one or more nodes, such as the gateway node 110. The communications network further comprises the PBX node 130 and the IMS network 102. The gateway node 110 may communicate with the PBX node 130. The gateway node 130 may further communicate with the first UE 121 through the IMS network 102, and with the second UE 122. SIP signals when establishing a call session between the first UE 121 and the second UE 122, may pass through the gateway node 110 and the PBX node 130 that the second UE 122 is associated to. In order to enhance the call session between the first UE 121 and the second UE 122, the gateway node 110 needs to establish a data channel that enhances the call session, and to negotiate parameters related to the data channel.

A number of embodiments will now be described, some of which may be seen as alternatives, while some may be used in combination.

The method according to embodiments will now be described from the view of the gateway node 110 together with FIG. 3. FIG. 3 depicts example embodiments of a method performed by the gateway node 110 for enhancing a call session between the first UE 121 and the second UE 122 in the communications network 100. The second UE 122 is associated to the PBX, node 130. This may mean that incoming and outgoing call session for the second UE 122, pass through, and is controlled by, the PBX node 130.

The first UE 121 may e.g. be a customer, and the second UE 122 may e.g. be an agent. In the method, a call session, a first data channel and a data channel, e.g. an IMS data channel, will be set up. The first UE 121 may support a data channel e.g. an IMS data channel which will be used for enhancing the call session. An IMS data channel when used herein may mean a data channel, such as a transport medium, established between two peers, such as two UEs, e.g. the first UE 121 and the second UE 122, in order to allow for full duplex exchange of arbitrary data. The data channel's characteristics, such as e.g. quality of service and bandwidth, are requested for by either UE, such as e.g. the first UE 121 and/or the second UE 122, and provisioned by the IMS network 102. An IMS data channel when used herein may further mean an application type media entry in an SDP that is used to transport the data channel. The IMS data channel may be according to Data Channel Media specifications from 3GPP TS26.114 "*IP Multimedia Subsystem (IMS); Multimedia telephony; Media handling and interaction*". Any one out of the first UE 121 and the second UE 122, may be compliant with, such as support, Data Channel Media specifications from 3GPP TS26.114 "*IP Multimedia Subsystem (IMS); Multimedia telephony; Media handling and interaction*".

Enhancing the call session may e.g. be referred to as enriching the call session.

The method comprises the following actions, which actions may be taken in any suitable order. Actions that are optional are presented in dashed boxes in FIG. 3.

Action 301

In some embodiments, the gateway node 110 receives a request from any one out of the first UE 121 and the second UE 122. The request requests to establish the call session between the first UE 121 and the second UE 122. The request to establish the call session between the first UE 121 and the second UE 122 may be a SIP message, such as e.g. a SIP invite message, and may be received via the IMS network 102.

When the request to establish the call session is received from the first UE 121, the gateway node 110 may send, such as e.g. forward, the request to the PBX node 130. When receiving an accept message from the PBX node 130, the gateway node 110 may in some embodiments, send such as e.g. forward, the received accept message to the first UE 121. This may be in order to establish the first call session between the first UE 121 and the PBX node 130. The accept message may be a SIP message, such as e.g. a SIP 200 OK message, and may be sent, such as forwarded to the first UE 121 via the IMS network 102. The first call session may be referred to as a first call leg. A SIP 200 OK message is a response message to a SIP request message, such as e.g. a SIP invite message. A SIP 200 OK message indicates acceptance of the received SIP request message.

Action 302

When the first call session between the first UE 121 and the PBX node 130, has been established, the gateway node 110 may receive an indication from the first UE 121 indicating that the first UE 121 accepts the requested call session to be enhanced.

In some embodiments, the indication indicating the that the first UE 121 accepts the requested call session to be enhanced, is received by the gateway node 110 in response to an indication sent by the gateway node 110 to the first UE 121. The indication instructs the first UE 121 to indicate to the gateway node 110 whether or not the first UE 121 accepts the requested call session between the first UE 121 and the second UE 122 to be enhanced.

Enhancing the call session when used herein, may mean that the call session is enhanced by the establishment of a data channel between the first UE 121 and the second UE 122. The data channel may allow the first UE 121 and the second UE 122 to exchange, such as e.g. send and receive, data related to the call session in real-time during the call session.

Action 303

A first data channel between the gateway node 110 and the first UE 121 may allow the gateway node 110 to communicate and exchange data related to a call session requested to be established.

In some embodiments, the gateway node 110 has received the request for establishing the call session between the first UE 121 and the second UE 122 from the first UE 121. When receiving from the first UE 121, a request to establish a first data channel between the first UE 121 and gateway node 110, the gateway node 110 establishes the first data channel between the first UE 121 and the gateway node 110.

In some embodiments, the gateway node 110 establishes the first data channel between the gateway node 110 and the first UE 121 by receiving the request, from the first UE 121, to establish a the first data channel between the gateway node 110 and the first UE 121. The request may be a SIP message, such as e.g. a SIP invite message or an SIP re-invite message, and may be received via the IMS network 102. In response to the received request, the gateway node 110 may send an accept message associated to the received request to the first UE 121 to establish the first data channel. The accept message indicates to the first UE 121 that the gateway node 110 accepts the request to establish the first data channel. The accept message may be SIP message, such as e.g. a SIP 200 OK message, and may be sent via the IMS network 102.

Action 304

In some embodiments, the gateway node 110 obtains data related to the call session between the first UE 121 and the second UE 122 using the first data channel. The obtained data may e.g. comprise any one or more out of: subscription data, such as subscription type, an identity of the first UE 121, personal information, any data pertaining to the reason of the call session.

The obtained data may be used by the gateway node 110 when establishing the call session between the first UE 121 and the second UE 122.

Action 305

For the call session to be established, the second UE 122 need to be available.

So, in some embodiments, upon the second UE 122 becoming available, the gateway node 110 establishes the call session between the first UE 121 and the second UE 122. The gateway node 110 may establish the call session by instructing the PBX node 130 to connect the first call session between the first UE 121 and the PBX node 130 with a second call session established between the second UE 122 and the PBX node 130. The second call session may be referred to as a second call leg. The gateway node 110 may become aware, such as e.g. be informed, that the second UE 122 is available by receiving an indication from the PBX node 130. The indication may indicate that the second UE 122 is available. The call session, when established, may enable, also referred to as support, transmissions, such as sending and/or receiving audio and/or video between the first UE 121 and the second UE 122. This may mean that first UE 121 and the second UE 122 are able to exchange audio and/or video media.

In some embodiments, the gateway node 110 indicates to the first UE 121 that the second UE 122 has become available. The PBX node 130 may be instructed when the gateway node 110 receives a request from the first UE 121 to be connected to the second UE 122. The request to be connected to the second UE 122 may be received from the first UE 121 in response to the indication that the second UE 122 has become available. The gateway node 110 may indicate the availability of the second UE 122 to the first UE 121 by using the established first data channel.

The established call session between the first UE 121 and the second UE 122 may be based on the obtained data related to the call session between the first UE 121 and the second UE 122.

Action 306

The established call session between the first UE 121 and the second UE 122 supports audio and/or video transmissions. In order to enhance the call session, a data channel according to embodiments herein will be established.

When the call session has been established between the first UE 121 and the second UE 122 via the PBX node 130 and via the IMS network 102, the gateway node 110 receives a request from any one out of the first UE 121 and the second UE 122. The request is for establishing a data channel between the first UE 121 and the second UE 122 to enhance the call session. The data channel may enhance the call session by supporting, such as e.g. enabling, transmissions of data between the first UE 121 and the second UE 122. The data may be may be a kind of data that is different from transmissions supported by a call session, such as the established call session, when it is not enhanced. The kind of data transmitted over the data channel when established may e.g. be data such as exchanging a digital file and the associated messages required to control such exchange, screen sharing between the first UE 121 and the second UE 122 or data enabling the second 122 to remotely control the first UE 121.

The received request may be a SIP message, such as e.g. an invite message or a re-invite message. The request to establish the data connection may comprise one or more first parameters related to the data channel to enhance the call session. The data channel may be an IMS data channel.

Action 307

To enhance the established call session between the first UE 121 and the second UE 122, a second data channel according to embodiments herein will be established. The second data channel is referred to as the data channel when described herein.

To establish the data channel to enhance the established call session between the first UE 121 and the second UE 122, one or more parameters related to the data channel will be negotiated and accepted.

The gateway node 110 negotiates the one or more parameters to be used in the requested data channel between the first UE 121 and the second UE 122.

In some embodiments, the gateway node 110 negotiates the parameters to be used in the requested data channel by sending, to the second UE 122, one or more first parameters related to the requested data channel. The one or more first parameters are accepted by the first UE 121 and are obtained from the received request for establishing the data channel.

As mentioned above, the request to establish the data channel may comprise the one or more first parameters. Thus, the gateway node 110 may obtain, e.g. extract, the one or more first parameters from the received request. The one or more first parameters may be comprised in a message such as an SDP message, wherein the one or more first parameters are data channel media entries in the SDP message. The SDP message may be an SDP offer. The one or more first parameters may be sent to the second UE 122 via a connection established between the gateway node 110 and the second UE 122. The connection may be a Web-Socket connection.

To conclude the negotiation, the gateway node 110 may receive one or more second parameters related to the requested data channel from the second UE 122. The one or more second parameters are referred to as the one or more parameters when described herein The one or more parameters may be received via the established connection between the gateway node 110 and the second UE 122, e.g. the third data channel. Therefore, in some embodiments, when receiving, from the second UE 122, the one or more parameters related to the requested data channel, which one or more parameters are accepted by the second UE 122 based on the one or more first parameters accepted by the first UE 121, the gateway node 110 sends an accept message to the first UE 121. The accept message indicates that the second UE 122 accepts the request to establish the data channel. The accept message comprises the one or more parameters. The accept message may be a SIP message, such as e.g. a 200 OK message. Similarly as for the one or more first parameters, the one or more parameters may be comprised in a SDP message, wherein the one or more parameters are data channel media entries in the SDP message. The SDP message may be an SDP answer that is sent to the first UE 121 in the accept message.

In some embodiments, responsive to receiving the one or more parameters from the second UE 122, the gateway node 110 sends the obtained data related to the call session to the second UE 122. The obtained data may be sent via a connection established between the gateway node 110 and the second UE 122, such as e.g. a WebSocket connection.

Action 308

When the one or more parameters related to the data channel has been negotiated, the gateway node 110 assists in establishes the data channel.

The gateway node 110 establishes the data channel according to the negotiation, to enhance the call session between the first UE 121 and the second UE 122. The call session is enhanced by the establishment of the data channel between the first UE 121 and the second UE 122, allowing the first UE 121 and the second UE 122 to exchange, such as e.g. send and receive, data related to the call session.

Establishing the data channel when used herein, may mean that the gateway node 110 assists in establishing the data channel.

In other words, the call session between two UEs, where one of the UEs 121, 122 is associated to the PBX node 130, is enhanced by establishing the data channel. The data channel allows transmissions such as e.g. exchanging, sending and/or receiving, of data related to the call session between the two UEs. This is an advantage since it improves the flexibility of the communications network. further, the gateway node 110 is not involved in the data channel content, such as the data transmitted using the data channel, rather the gateway node 110 is only involved in, such as being part of, the establishment of the data channel. This, reduces the latency of the data channel communications.

The data channel to enhance the call session is established based on the one or more parameters.

In some embodiments, the data channel between the first UE 121 and the second UE 122 is represented by a peer-to-peer data channel bypassing the PBX node 130.

The method according to embodiments will now be described from the view of the UE 120, 121, 122 together with FIG. 4. FIG. 4 depicts example embodiments of a method performed by a UE 120, 121, 122 for enhancing a call session between a first UE 121 and a second UE 122 in a communications network 100. In the method, a call session, a first data channel and a data channel, e.g. an IMS data channel, will be set up. As mentioned above, the first UE 121 may e.g. be a customer, and the second UE 122 may e.g. be an agent. Enhancing the call session may e.g. be referred to as enriching the call session.

The second UE 122 is associated to a PBX 130. This may mean that incoming and outgoing call session for the second UE 122, pass through, and is controlled by, the PBX node 130.

The UE 120, 121, 122 may be represented by any one out of the first UE 121 and the second UE 122. The first UE 121 supports a data channel e.g. an IMS data channel, which will be used for enhancing the call session. An IMS data channel when used herein may mean An IMS data channel when used herein may mean a data channel, such as a transport medium, established between two peers, such as two UEs, e.g. the first UE 121 and the second UE 122, in order to allow for full duplex exchange of arbitrary data. The data channel's characteristics, such as e.g. quality of service and bandwidth, are requested for by either UE, such as e.g. the first UE 121 and/or the second UE 122, and provisioned by the IMS network 102. An IMS data channel when used herein may further mean an application type media entry in an SDP that is used to transport the data channel. The IMS data channel may be according to Data Channel Media specifications from 3GPP TS26.114 "*IP Multimedia Subsystem (IMS); Multimedia telephony; Media handling and interaction*". Enhancing the call session may e.g. be referred to as enriching the call session. The UE 120, 121, 122, such as e.g. any one out of the first UE 121 and the second UE 122, may be compliant with, such as support, Data Channel Media specifications from 3GPP TS26.114 "*IP Multimedia Subsystem (IMS); Multimedia telephony; Media handling and interaction*".

The method comprises the following actions, which actions may be taken in any suitable order. Actions that are optional are presented in dashed boxes in FIG. 4.

Action 401

In some embodiments, the UE 120, 121, 122 sends a request to the gateway node 110. The request is to establish the call session between the first UE 121 and the second UE 122.

When the UE 120, 121, 122 is represented by the first UE 121, the first UE 121 may receive an accept message from the gateway node 110, in order to establish the first call session between the first UE 121 and the PBX node 130. The accept message may be a SIP message, such as e.g. a 200 OK message, and may be sent, such as forwarded to the first UE 121 via the IMS network 102. The first call session may be referred to as a first call leg.

Action 402

When the UE 120, 121, 122 is represented by the first UE 121, and when the first call session between the first UE 121 and the PBX node 130 has been established, the first UE 121 may send, to the gateway node 110, an indication indicating that the first UE 121 accepts the call session to be enhanced.

In some embodiments, the indication indicating that the first UE 121 accepts the call session to be enhanced, is sent to the gateway node 110 in response to receiving an indication from the gateway node 110. The indication instructs the first UE 121 to indicate to the gateway node 110 whether or not the first UE 121 accepts the call session between the first UE 121 and the second UE 122 to be enhanced. The first UE 121.

As mentioned above, enhancing, such as enriching, the call session when used herein, may mean that the call session is enhanced by the establishment of a data channel between the first UE 121 and the second UE 122. The data channel may allow the first UE 121 and the second UE 122 to exchange, such as e.g. send and receive, data related to the call session.

Action 403

A first data channel between the gateway node 110 and the first UE 121 allows the gateway node 110 to communicate and exchange data related to the call session requested to be established.

Therefore, in some embodiment, when the UE 120, 121, 122 is represented by the first UE 121, the first UE 121 sends to the gateway node 110, a request to establish a first data channel between the first UE 121 and gateway node 110. The request may be a SIP message, such as e.g. an SIP invite message or an SIP re-invite message, and may be sent via the IMS network 102.

In response to the sent request, the first UE 121 may receive an accept message from the gateway node 110. The accept message is associated with the sent request to establish the first data channel. The accept message indicates to the first UE 121 that the gateway node 110 accepts the request to establish the first data channel. The accept message may be SIP message, such as e.g. a SIP 200 OK message, and may be sent via the IMS network 102.

Action 404

In some embodiment, when the first data channel between the first UE 121 and the gateway node 130 has been established, the first UE 121 provides data related to the call session between the first UE 121 and the second UE 122 using the first data channel.

The provided data may e.g. comprise subscription data, such as subscription type, an identity of the first UE 121, personal information, any data pertaining to the reason of the call session. The provided data related to the call session may be used by the gateway node 110 when establishing the call session between the first UE 121 and the second UE 122.

Action 405

To establish the call session, when the first UE 121 has requested the call session, the second UE 122 needs to be available.

In some embodiments, when the UE 120, 121, 122 is represented by the first UE 121, the establishing of the call session comprises that the first UE 121 receives an indication from the gateway node 110. The indication indicates that the second UE 122 has become available. The first UE 121 may then send a request to the gateway node 110. The request is to be connected to the second UE 122. The first UE 121 may receive the indication from the gateway node 110, that the call session between the first UE 121 and the second UE 122 is requested to be established.

According to an example scenario, while waiting for the second UE 122 to become available, the first UE 121 may have been placed in a queue. The queue may e.g. be managed by any one out the gateway node 110 and the PBX node 130.

The established call session between the first UE 121 and the second UE 122 may be based on the provided data related to the call session between the first UE 121 and the second UE 122.

Action 406

The established call session between the first UE 121 and the second UE 122 supports audio and/or video transmissions. In order to enhance the call session, a second data channel according to embodiments herein will be established. The second data channel is referred to as the data channel when described herein.

When the call session has been established between the first UE 121 and the second UE 122 via the PBX node 130 and via the IMS network 102, the UE 120, 121, 122 sends a request to the gateway node 110. The request is for establishing a data channel to enhance the call session between the first UE 121 and the second UE 122. The data channel may enhance the call session by supporting, such as e.g. enabling, transmissions of data between the first UE 121 and the second UE 122. The data may be a kind of data that is different from transmissions supported by the established call session when not being enhanced. The kind of data transmitted over the data channel when established may e.g. be data such as exchanging a digital file and the associated messages required to control such exchange, screen sharing between the first UE 121 and the second UE 122 or data enabling the second 122 to remotely control the first UE 121. The data channel may be an IMS data channel. The sent request may be a SIP message, such as e.g. an invite message or a re-invite message.

In some embodiments, the request to establish the data channel comprises one or more first parameters related to the requested data channel. The one or more first parameters may be accepted by the first UE 121.

As mentioned above, the one or more first parameters may be comprised in a SDP message, wherein the one or more first parameters are data channel media entries in the SDP message. The SDP message may be an SDP offer.

Action 407

To establish a data channel to enhance the established call session between the first UE 121 and the second UE 122, parameters related to the data channel will be negotiated and accepted.

The UE 120, 121, 122 negotiates one or more parameters to be used in the requested data channel.

In some embodiments, the negotiating of the one or more parameters to be used in the requested data channel comprises, i.e. is performed by, the first UE 121 receiving an accept message from the gateway node 110. The accept message indicates that the second UE 122 accepts the request to establish the data channel. The accept message comprises the one or more parameters related to the requested data channel. The one or more parameters are accepted by the second UE 122 based on the one or more first parameters accepted by the first UE 121 These one or more parameters based on the one or more first parameters, are also referred to as the one or more second parameters when described herein. The accept message may be a SIP message, such as e.g. a 200 OK message. Similarly as for the one or more first parameters, the one or more parameters may be comprised in an SDP message, wherein the one or more parameters are data channel media entries in the SDP message. The SDP message may be an SDP answer that is sent to the first UE 121 in the accept message.

In some embodiments, the one or more first parameters may be one or first parameters accepted by the second UE 122. when the one or more first parameters are one or more first parameters accepted by the second UE 122, the negotiating of the one or more parameters to be used in the requested data channel comprises second UE 122 receiving, from the gateway node 110, an accept message. The accept message indicates that the first UE 121 accepts the request to establish the data channel. The accept message comprises one or more parameters related to the requested data channel. The one or more parameters are accepted by the first UE 121 based on the one or more first parameters accepted by the second UE 122. The one or more parameters may be sent to the second UE 122 via the connection established between the gateway node 110 and the second UE 122. The connection may be a WebSocket connection.

Action 408

When the one or more parameters related to the data channel has been negotiated, the UE 120, 121, 122 establishes the data channel.

The UE 120, 121, 122 establishes the requested data channel to enhance the call session between the first UE 121 and the second UE 122, using the negotiated one or more parameters.

As mentioned above, enhancing, such as enriching, the call session when used herein, may mean that the call session is enhanced by the establishment of a data channel between the first UE 121 and the second UE 122. The data channel may allow the first UE 121 and the second UE 122 to exchange, such as e.g. send and receive, data related to the call session.

In other words, a call session between two UEs, where one of the UEs is associated to a PBX, is enhanced by establishing a data channel. The data channel allows transmissions such as e.g. exchanging, sending and/or receiving, of data related to the call session between the two UEs. This is an advantage since it improves the flexibility of the communications network. further, the gateway node 110 is not involved in the data channel content, such as the data transmitted using the data channel, rather the gateway node 110 is only involved in, such as being part of, the establishment of the data channel. This, reduces the latency of the data channel communications.

The data channel to enhance the call session is may be established based on the one or more parameters.

In some embodiments, the data channel between the first UE 121 and the second UE 122 is represented by a peer-to-peer data channel bypassing the PBX node 130.

Below, FIGS. 5a-5e will be described.

Figure 5A:
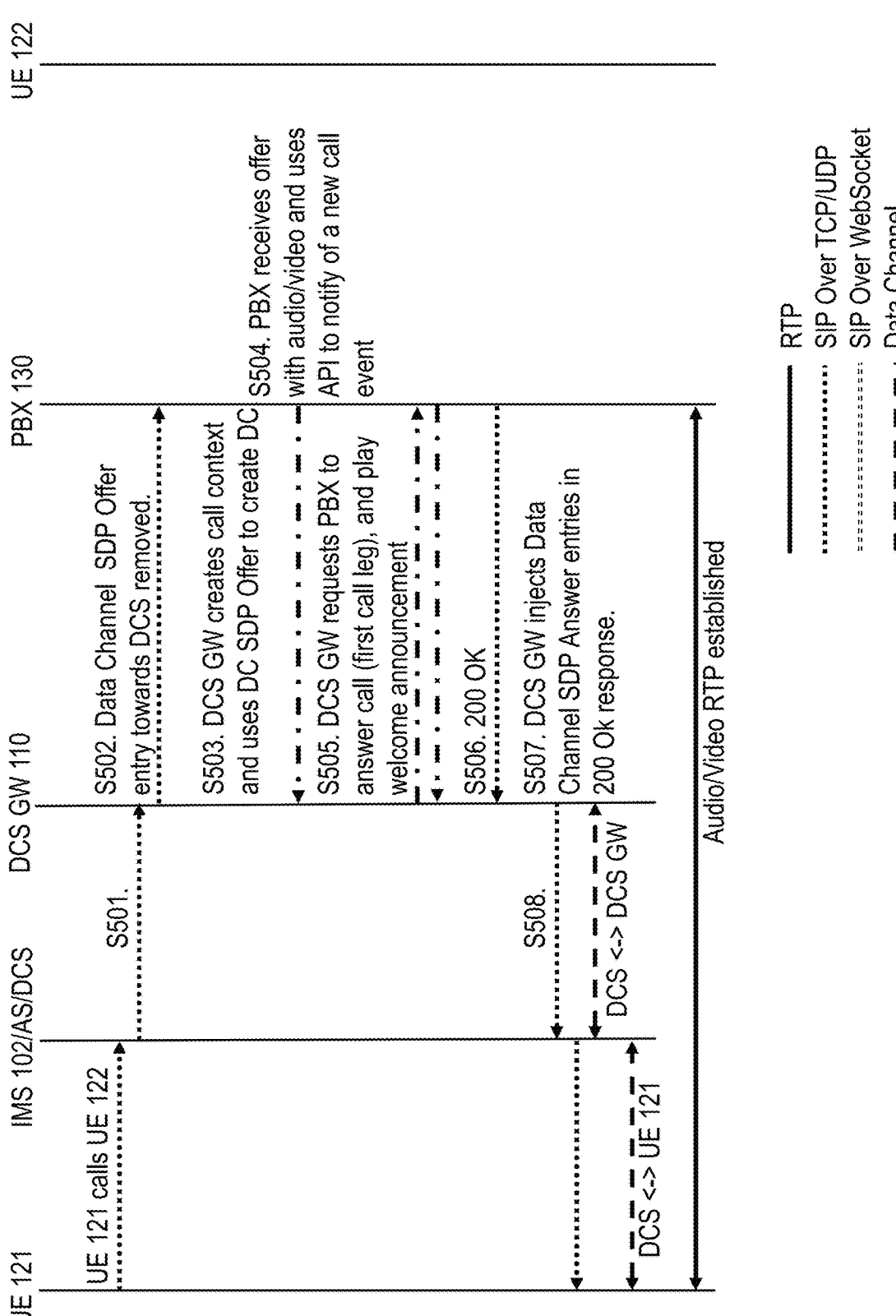
FIGS. 5 a, b, c, d and e are flowcharts depicting embodiments of a method.
Figure 5B:
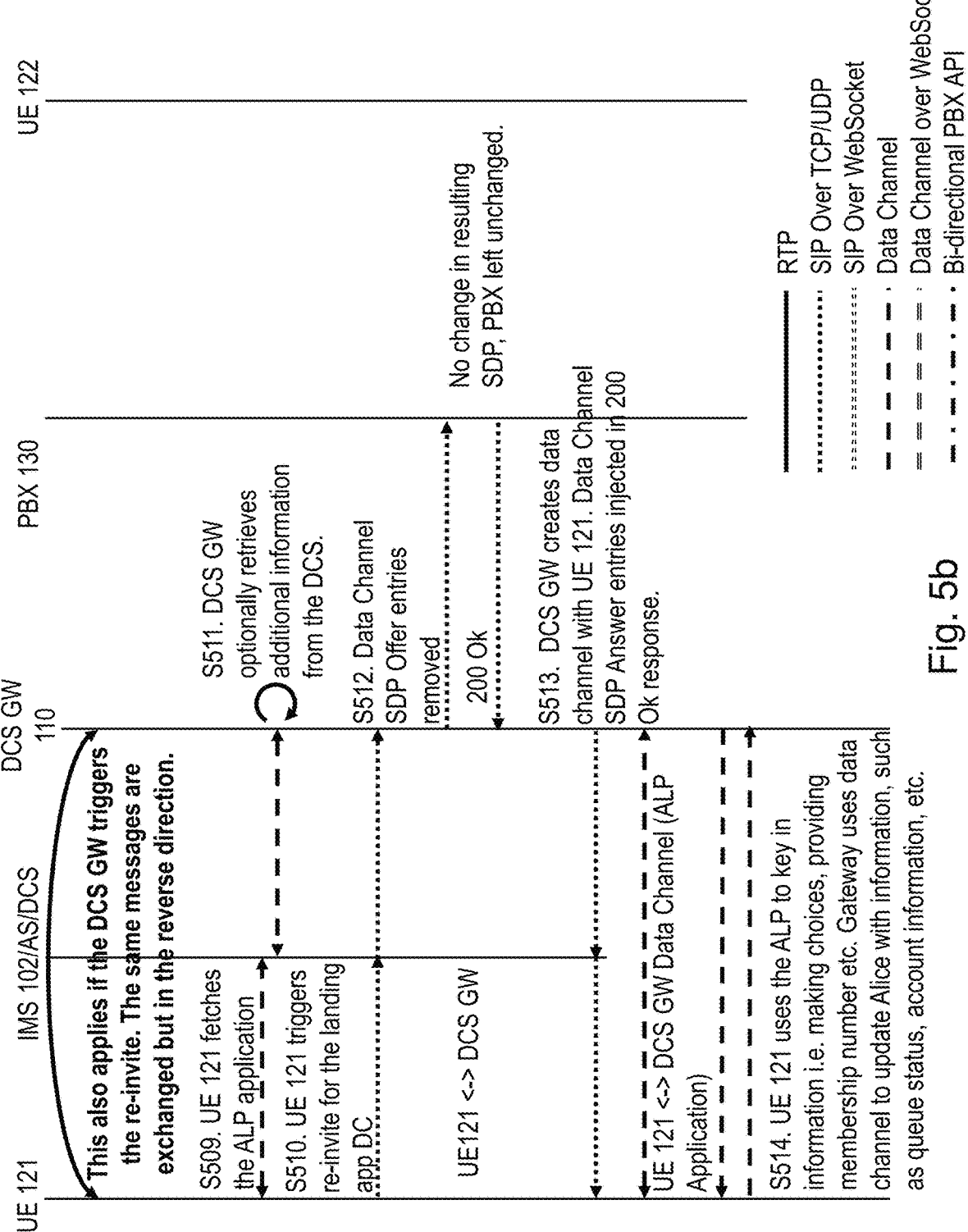
Figure 5C:
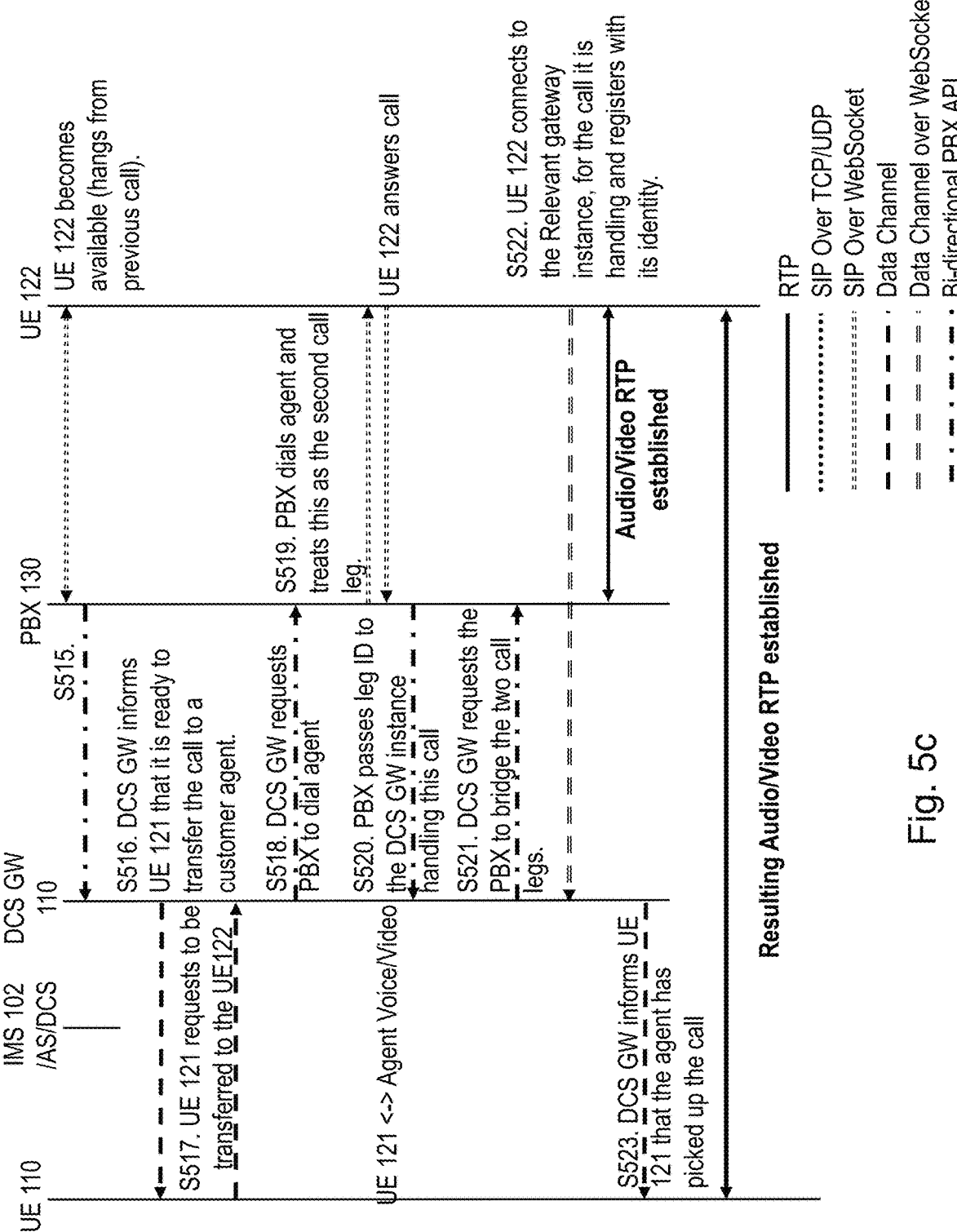
Figure 5D:
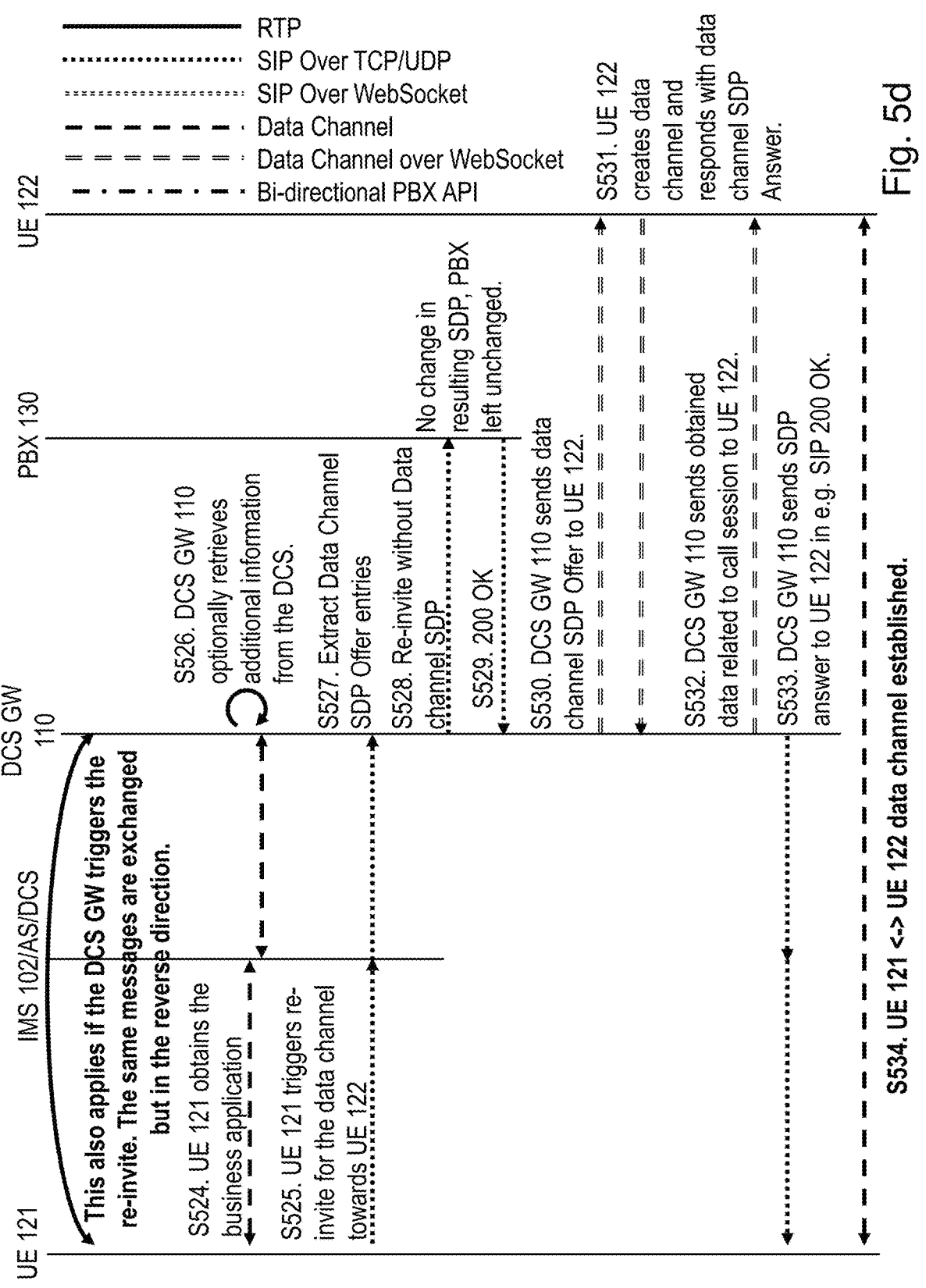

Actions S501-S508 are related to an initial call establishment depicted in FIG. 5a, Actions S509-S514 are related to establishment of a data channel depicted in FIG. 5b, Actions S515-S523 are related to establishing the call session depicted in FIG. 5c, Actions S524-S534 are related to establishing the data channel to enhance the call session depicted in FIG. 5d.

Figure 5E:
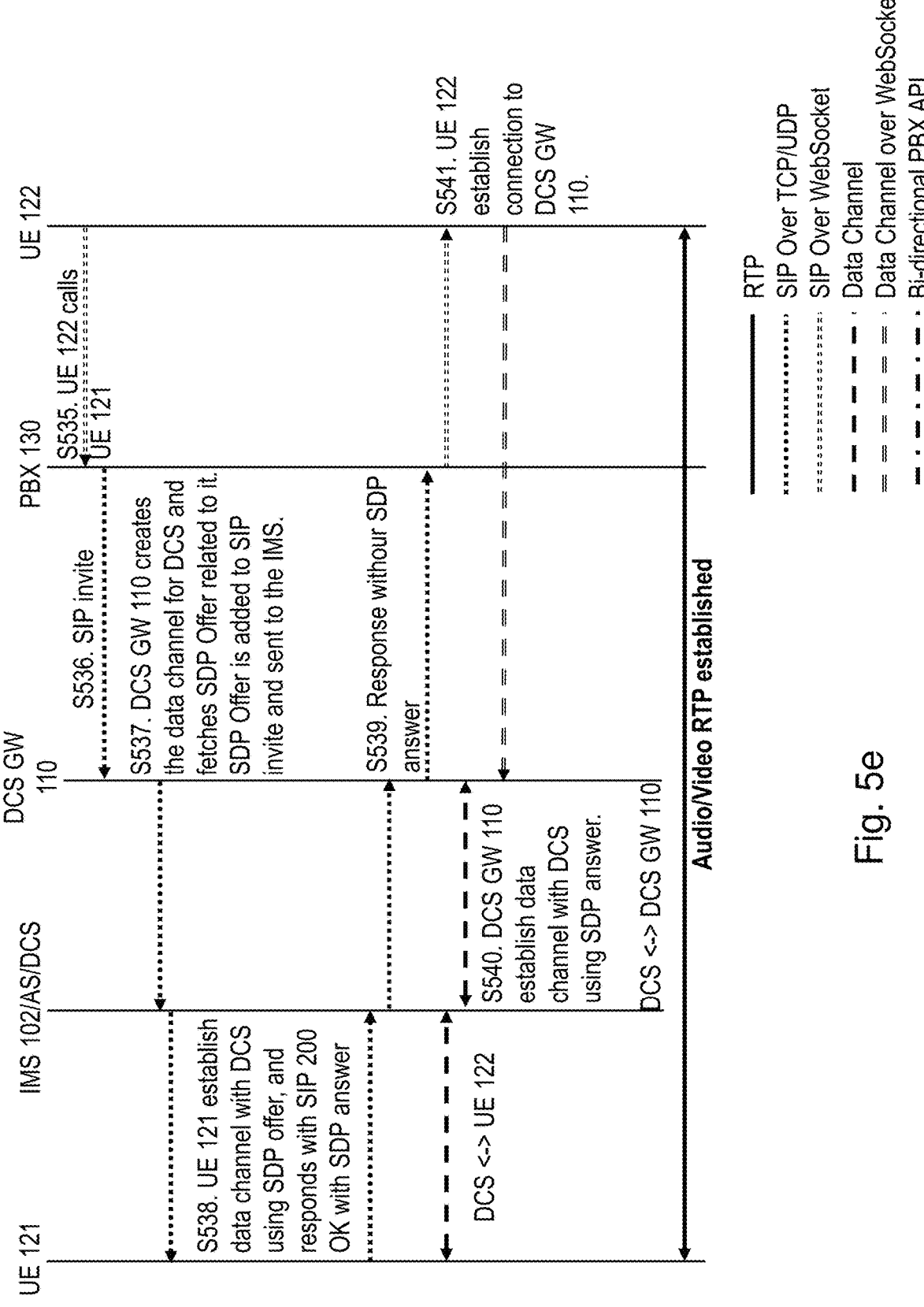

Actions S535-S541 are related to establishing the call session, when the call session is requested by the second UE 122 depicted in FIG. 5e.

These methods depict examples of detailed actions according to embodiments herein. In the FIGS. 5a-e the gateway node 110 is referred to as DCS GW 110, the PBX node 130 is referred to as PBX 130, the first UE 121 is referred to as UE 121 and the second UE 122 is referred to as UE 122.

The actions may be taken in any suitable order. Some actions are new according to embodiments herein and are marked so, and some steps are performed according prior art.

Actions S1a-S8a are related to an example of an initial call establishment and will be described below. See FIG. 5a.

S501. The DCS GW 110, such as e.g. the gateway node 110, may receive a SIP invite message, such as e.g. the request to establish the call session between the first UE 121 and the second UE 122, wherein the second UE 122 is associated to the PBX node 130, from the UE 121, such as e.g. the first UE 121.

This step is associated to Actions 301 and 401 described above.

S502. The DCS GW 110 may extract data channel media entries from the incoming message before passing it to the PBX 130, such as e.g. the PBX node 130.

This step is associated to Action 301 described above.

S503. While the PBX 130 handles the SIP invite message and answers the call, the DCS GW 110 may initiate a data channel connection to the DCS using the extracted data channel media entries.

S504. At the same time, the PBX 130 may inform the DCS GW 110 of a newly established call leg, such as the first call session, allowing for association of the call instance in the DCS GW 110 with that of the PBX 130.

S505. The DCS GW 110 may then requests the PBX 130 to play a welcome message on the newly established call leg, such as e.g. the first call session, via an interface between the DCS GW 110 and the PBX 130.

S506. The PBX 130 may respond to the SIP invite message with a SIP 200 OK message.

This step is associated to Action 301 described above.

S507. The DCS GW 110 may add an SDP answer, e.g. data channel media entries accepted by the DCS GW 110 for the data channel, to the received SIP 200 OK.

This step is associated to Action 301 described above.

S508. The DCS GW 110 may forward the response, such as the SIP 200 OK, back to the IMS, such as the IMS network 102, and in the end the UE 121 so that the call, such as the first call session, can be established. When the call, such as e.g. the first call session, is established, the UE 121 may receive an indication instructing the UE 121 to indicate whether or not the UE 121 accepts the requested call session to be enhanced, such as enriched. If the UE 121 declines, legacy procedures for a call session with a UE 122, such as e.g. the second UE 122, associated to the PBX 130 may be used. If the UE 121 accepts, procedures to enhance the requested call session may be initiated.

This step is associated to Actions 301-302 and 401-402 described above.

Actions 509-514 are related to an example of an establishment of a data channel and will be described below. See FIG. 5b.

S509. When the call, such as e.g. the first call session between the first UE 121 and the PBX node 130, is established and the UE 121, such as e.g. the first UE 121, has accepted an enhanced call session, the UE 121 may fetch, such as obtain, an application providing ALP from the DCS.

S510. The UE 121 may send a SIP re-invite message, such as e.g. the request to establish the first data channel, to the IMS, such as e.g. the IMS network 102, to establish the connection, such as e.g. the first data channel, between the UE 121 ALP application and the DCS GW 110, such as e.g. the gateway node 110. The DCS GW 110 receives may receive the SIP re-invite message from the IMS 102. In another example scenario, DCS GW 110 may initiate establishing the first data channel by sending the SIP re-invite message, such as e.g. the request to establish the first data channel, to the UE 121 via the IMS 102.

This step is associated to Actions 303 and 403 described above.

S511. At the same time, the DCS GW 110 may receive, such as obtain, the corresponding ALP data based on the PBX 130 profile in the IMS and the DCS repository. The data may contain any type of data, such as e.g. information about the UE 121 or customized codes.

S512. The DCS GW 110 may intercept the SIP message, such as e.g. the request to establish the first data channel, and extract data channel media entries related to the first data channel from the incoming message before passing it to the PBX 130. The DCS GW 110 may receive a response, e.g. a SIP 200 OK, from the PBX 130.

S513. The DCS GW 110 may create the data channel, such as the first data channel, for the ALP and may respond to the UE 121 with a SIP 200 OK so the connection can be established between the two applications, such as the gateway node 110 and the first UE 121. The DCS GW 110 may add an SDP answer, e.g. data channel media entries accepted by the DCS GW 110, for the first data channel to the SIP 200 OK. In the example scenario mentioned above where the DCS GW 110 initiates the first data channel, the DCS GW 110 may create the data channel, such as the first data channel, for the ALP when receiving a response, such as a SIP 200 OK, from the UE 121. This step is associated to Actions 303 and 403 described above.

S514. The UE 121 may provide data related to the requested call session using established data channel, such as e.g. the first data channel. The data may be provided through the obtained ALP application. The DCS GW 110 may obtain the provided data. The UE 121 may be placed in a queue until the UE 122, such as the second UE 122, is available. The queue may be managed by the DCS GW 110 based on events reported by the PBX 130. The events may be e.g. that the UE 122 has become available. The UE 121 may be indicated a priority in the waiting queue, and the queue may be updated as and when the PBX 130 reports changes in state with respect to e.g. previous call sessions.

This step is associated to Actions 304 and 404 described above

Actions S515-S523 are related to establishing the call session and will be described below. See FIG. 5c.

S515. When the UE 122, such as e.g. the second UE 122, has become available, the PBX 130, such as e.g. the PBX node 13, may inform, such as indicate to, the DCS GW 110, such as e.g. the gateway node 110, of the event.

This step is associated to Actions 305 and 405 described above.

S516. The DCS GW 110 may indicate to the UE 121, such as e.g. the first UE 121, that the UE 122 has become available.

This step is associated to Actions 305 and 405 described above.

S517. The UE 121 may send a request to be connected to the UE 122.

This step is associated to Actions 305 and 405 described above.

S518. The DCS GW 110 may send a request to the PBX 130 to establish a connection, such as e.g. the second call session, to the UE 122. The second call session may be referred to as the second call leg.

This step is associated to Actions 305 and 405 described above.

S519. The PBX 130 may establish the connection, or second call leg, such as e.g. the second call session, between the UE 122 and the PBX 130.

S520. The PBX 130 may report an identity associated to the connection, or second call leg, such as the second call session, to the DCS GW 110.

S521. The PBX 130 may be instructed by the DCS GW 110 to establish the call session between the UE 121 and the UE 122 by e.g. connecting the first call session with the second call session. The instructing may be sent to the PBX 130 via the interface between the DCS GW 110 and the PBX 130. Upon receiving the instruction, the PBX 130 may connect, such as establish the second call session, to the UE 122. The PBX 130 may bridge, such as connect, the first call leg, such as the first call session with the second call leg, such as the second call session.

S522. The UE 122 may establish a connection to the DCS GW 110. The connection may be a WebSocket comprising a third data channel. The UE 122 may register with an identity, such as e.g. an agent identity.

S523. The DCS GW 110 may inform, such as indicate, to the UE 121 that call session with the UE 122 is established.

Actions S524-S534 are related to establishing the data channel to enhance the call session and will be described below. See FIG. 5*d*.

S524. The UE 121, such as e.g. the first UE 121, may fetch, such as obtain, an application from the DCS. The application may be related to the PBX 130, such as e.g. the PBX node 130.

S525. The UE 121 may sends a SIP re-invite message, such as e.g. the request to establish the data channel to enhance the call session between the first UE 121 and the second UE 122, such as e.g. the second UE 122, to the DCS GW 110 such as e.g. the gateway node 110. The SIP re-invite message requests the data channel to enhance the call session to be established.

This step is associated to Actions 306 and 406 described above.

S526. The DCS GW 110 may receive, such as obtain, the application from the DCS. The DCS GW 110 may update a Web server that hosts the UE 122 application, such as e.g. browser page, in order for it be customizable.

S527. Upon receiving the SIP re-invite, such as e.g. the request to establish the data channel, the DCS GW 110 may extract, such as obtain, the data channel media entry, such as e.g. the one or more first parameters related to the requested data channel, from an SDP offer comprised in the received SIP re-invite.

This step is associated to Actions 306 and 406 described above.

S528. The DCS GW 110 may forward the SIP re-invite to the PBX 130 without the extracted data channel media entries.

S529. The DCS GW 110 may receive a SIP 200 OK message, such as an accept message, from the PBX 130.

S530. The DCS GW 110 may send the extracted data channel media entries, such as e.g. the one or more first parameters, to the UE 122. The extracted data channel media entries may be an SDP offer.

This step is associated to Actions 307 and 407 described above.

S531. The UE 122 may respond with an SDP answer, comprising data channel media entries, such as the one or more parameters related to the requested data channel that is accepted by the second UE 122. The UE 122 may apply the data channel media entries to the requested data channel.

This step is associated to Actions 307 and 407 described above.

S532. The DCS GW 110 may send the obtained data related to the call session to the UE 122.

S533. The DCS GW 110 may send the SDP answer, such as e.g. the one or more parameters related requested data channel, to the UE 121. The SDP answer may be sent in an accept message, such as e.g. a SIP 200 OK message.

This step is associated to Actions 307 and 407 described above.

S534. Upon receiving the accept message, UE 121 may apply the incoming SDP answer, such as e.g. the one or more parameters related to the requested data channel, and the data channel is established between the UE 121 and UE 122.

This step is associated to Actions 308 and 408 described above.

Actions S535-S541 are related to establishing the call session, when the call session is requested by the second UE 122 and will be described below. See FIG. 5*d*.

S535. In this scenario, the UE 122, such as the second UE 122, may request the call session to be established between the UE 121, such as the first UE 121, and the UE 122. The request, such as a SIP invite message, may be sent to the PBX 130, such as the PBX node 130.

This step is associated to Actions 301 and 401 described above.

S536. The PBX 130 may send the received request. Such as the SIP invite message, to the DCS GW 110, such as the gateway node 110.

This step is associated to Actions 301 and 401 described above.

S537. The DCS GW 110 may create the data channel to the DCS, fetch, such as obtain, its SDP offer and insert it in the SIP invite message before forwarding it to the IMS, such as the IMS network 102, and in the end the UE 121. The SDP offer may comprise data channel media entries.

S538. When receiving the SIP invite message, the UE 121 may create, such as establish, a connection, such a data channel, with the DCS, using, such as applying, the received SDP offer. The UE 121 may send a SIP 200 OK, such as e.g. an accept message, to the DSC GW 110. The SIP 200 OK message may comprise an SDP answer. The SDP answer may comprise data channel media entries.

S539. Upon receiving the SIP 200 OK from the IMS, or the UE 121, the DCS GW 110 may extract the SDP answer for the data channel with the DCS and forward the response to the PBX.

This step is associated to Actions 301 and 401 described above.

S540. The DCS GW 110 applies the received SDP answer to the data channel while waiting for the connection to be established.

S541. The UE 122 may establish a connection to the DCS GW 110. The connection may be a WebSocket comprising a third data channel. The UE 122 may register with an identity, such as e.g. an agent identity.

This approach allows a separation of the PBX 130, the ALP application and the company applications. The ALP application decides which company application to download and execute. At the end of the call session all the resources are released ready for the next call session.

Figure 6:
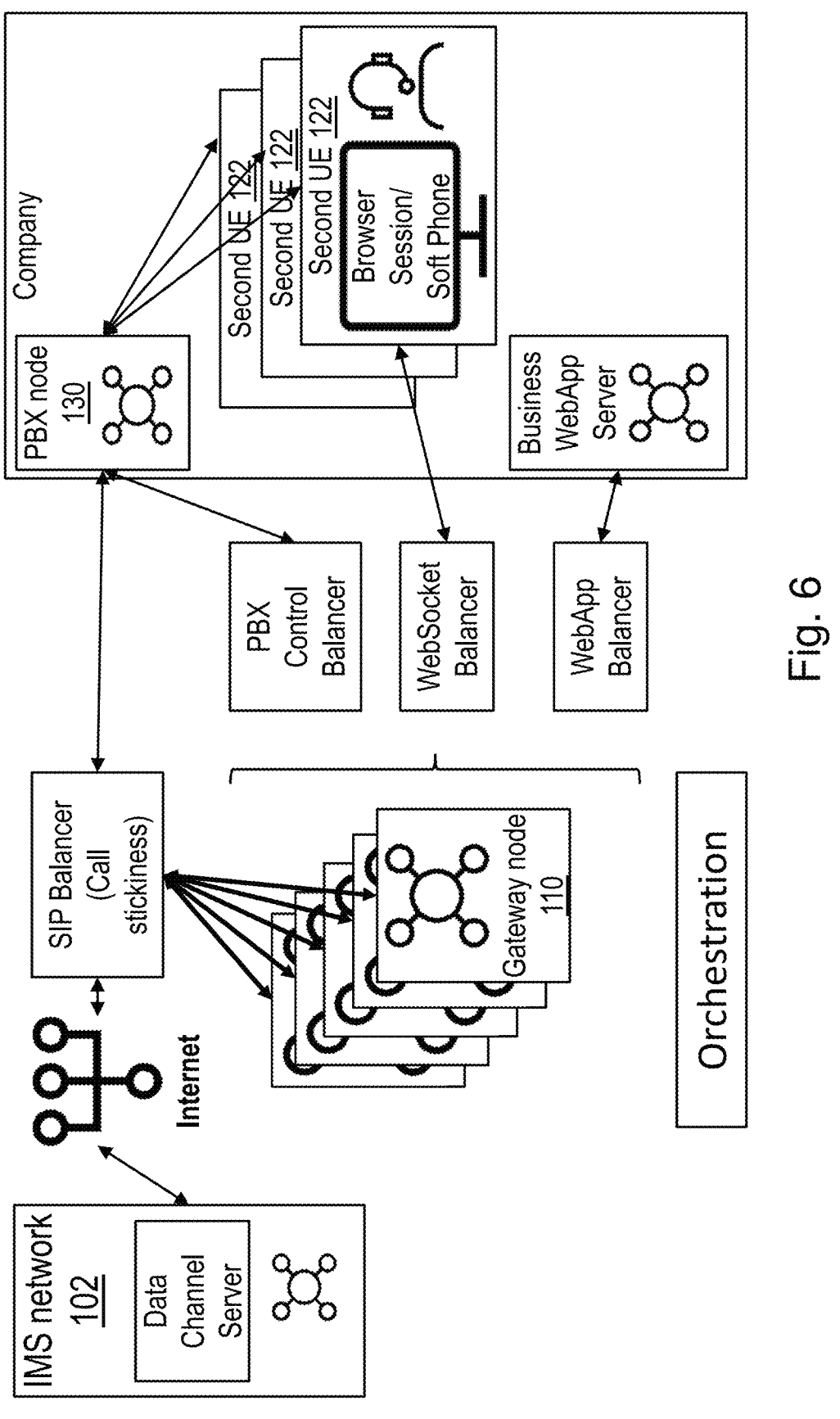
FIG. 6 is a schematic block diagram illustrating example embodiments of a cloud implementation.

FIG. 6 shows how the gateway node 110 may be integrated in a cloud environment.

Since the gateway node 110 is capable of handling each incoming/outgoing call between the first UE 121 to the second UE 122 as distinct objects instantiated at arrival of the initial invite from the IMS network 102 or the PBX node 130, the ability to make use of the cloud to handle resources required for higher volumes of calls may be possible. The resources may in such a scenario be deployed instantly.

One way may be to create one gateway node 110 for each PBX node 130. This may allow a static connection for all the nodes, but it does not allow any elasticity.

Another way may be to allocate a series of gateway nodes 110 instances and split them on a per-call basis.

A challenge may be to have the right balancer for each of the connections, such as e.g. SIP, PBX control, UE and the application control, the gateway node 110 needs to handle.

An orchestration may be configured to spawn a new gateway node instance, such as a gateway node 110 instance, when the currently running instances have reached their maximum number of calls. Because the gateway node 110 is not actively involved after the call session is established, this may have minimal impact on the load of the cloud infrastructure. The active data channels are directly established between the first UE 121 and the second UE 122.

Figures 7A, 7B:
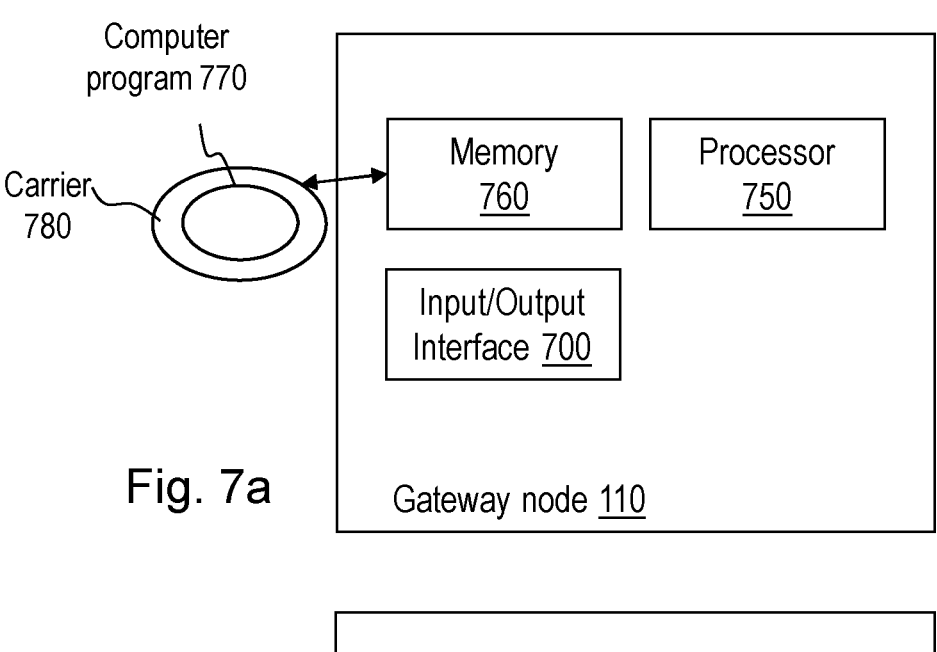
FIGS. 7 a and b are schematic block diagrams illustrating embodiments of a gateway node.

To perform the method actions, the gateway node 110, may comprise an arrangement depicted in FIGS. 7a and b. The gateway node 110 is configured to enhance a call session between a first UE 121 and a second UE 122 in a communications network 100. The second UE 122 is adapted to be associated to a PBX node 130.

The gateway node 110 may comprise an input and output interface 700 configured to communicate with e.g. the first UE 121, the second UE 122, the PBX node 130 and with network nodes in the communications network 100.

The gateway node 110 is further configured to, e.g. by means of a receiving unit 710 in the gateway node 110, when a call session has been established between the first UE 121 and the second UE 122 via the PBX node 130 and via an IMS network 102, receive, from any one out of the first UE 121 and the second UE 122, a request for establishing a data channel to enhance the call session.

The gateway node 110 may further be configured to, e.g. by means of the receiving unit 710 in the gateway node 110, receive, from any one out of the first UE 121 and the second UE 122, a request to establish the call session between the first UE 121 and the second UE 122.

The gateway node 110 is further configured to, e.g. by means of a negotiating unit 620 in the gateway node 110, negotiate one or more parameters adapted to be used in the requested data channel between the first UE 121 and the second UE 122.

The gateway node 110 may further by configured to, e.g. by means of the negotiating unit 720 in the gateway node 110, negotiate the one or more parameters adapted to be used in the requested data channel by: Sending, to the second UE 122 one or more first parameters adapted to be related to the requested data channel. The one or more first parameters are adapted to be accepted by the first UE 121 and are adapted to be obtained from the received request for establishing the data channel. When receiving, from the second UE 122, one or more parameters adapted to be related to the requested data channel, which one or more parameters are adapted to be accepted by the second UE 122 based on the one or more first parameters adapted to be accepted by the first UE 121, the gateway node 110 may send an accept message to the first UE 121. The accept message is adapted to indicate that the second UE 122 accepts the request to establish the data channel. The accept message is adapted to comprise the one or more parameters.

The gateway node 110 is further configured to, e.g. by means of an establishing unit 730 in the gateway node 110, establish the data channel according to the negotiation, to enhance the call session between the first UE 121 and the second UE 122.

The data channel to enhance the call session may be adapted to be established based on the one or more parameters.

The data channel between the first UE 121 and the second UE 122 may be adapted to be represented by a peer-to-peer data channel adapted to bypass the PBX node 130.

The gateway node 110 may further be configured to, e.g. by means of the establishing unit 730 in the gateway node 110, when receiving from the first UE 121, a request to establish the first data channel between the first UE 121 and gateway node 110, establish the first data channel between the first UE 121 and the gateway node 130.

The gateway node 110 may further be configured to, e.g. by means of the establishing unit 730 in the gateway node 110, upon the second UE 122 becoming available, establish the call session between the first UE 121 and the second UE 122 by instructing the PBX node 130 to connect a first call session between the first UE 121 and the PBX node 130 with a second call session between the second UE 122 and the PBX node 130.

The gateway node 110 may further be configured to, e.g. by means of the establishing unit 730 in the gateway node 110, establish the call session by indicating to the first UE 121 that the second UE 122 has become available, and instruct the PBX node 130 when receiving a request from the first UE 121 to be connected to the second UE 122.

The call session between the first UE 121 and the second UE 122 may adapted to be based on the obtained data.

The gateway node 110 may further be configured to, e.g. by means of an obtaining unit 740 in the gateway node 110, obtain data adapted to be related to the call session between the first UE 121 and the second UE 122 by using the first data channel.

The embodiments herein may be implemented through a respective processor or one or more processors, such as the processor 750 of a processing circuitry in the gateway node 110 depicted in FIG. 7a, together with respective computer program code for performing the functions and actions of the embodiments herein. The program code mentioned above may also be provided as a computer program product, for instance in the form of a data carrier carrying computer program code for performing the embodiments herein when being loaded into the gateway node 110. One such carrier may be in the form of a CD ROM disc. It is however feasible with other data carriers such as a memory stick. The computer program code may furthermore be provided as pure program code on a server and downloaded to the gateway node 110.

The gateway node 110 may further comprise a memory 760 comprising one or more memory units. The memory 760 comprises instructions executable by the processor 750 in the gateway node 110. The memory 760 is arranged to be used to store e.g. information, messages, indications, configurations, thresholds, timer values, reports, locations, tracking areas, timing advance values, communication data and applications to perform the methods herein when being executed in the gateway node 110.

In some embodiments, a computer program 770 comprises instructions, which when executed by the respective at least one processor 750, cause the at least one processor 750 of the gateway node 110 to perform the actions above.

In some embodiments, a respective carrier 780 comprises the respective computer program 770, wherein the carrier 780 is one of an electronic signal, an optical signal, an electromagnetic signal, a magnetic signal, an electric signal, a radio signal, a microwave signal, or a computer-readable storage medium.

Those skilled in the art will appreciate that the units in the gateway node 110 described above may refer to a combination of analog and digital circuits, and/or one or more processors configured with software and/or firmware, e.g. stored in the gateway node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 8A:
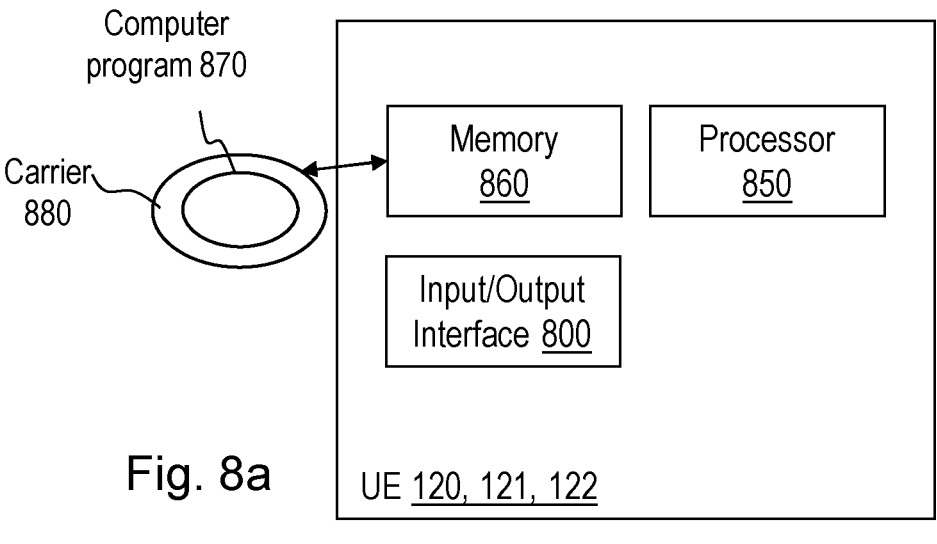
FIGS. 8 *a* and *b* are schematic block diagrams illustrating embodiments of a UE.
Figure 8B:
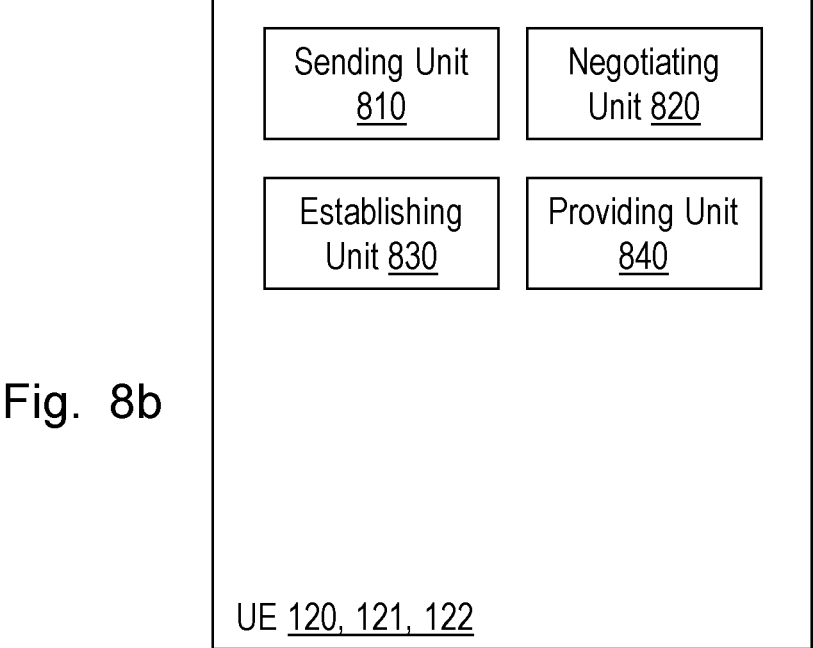

To perform the method actions, the UE 120, 121, 122, may comprise an arrangement depicted in FIGS. 8a and *b*. The UE 120, 121, 122 is configured to enhance a call session between a first UE 121 and a second UE 122 in a communications network 100. The second UE 122) is adapted to be associated to a PBX, node 130.

The UE 120, 121, 122 may be adapted to be represented by any one out of the first UE 121 and the second UE 122.

The UE 120, 121, 122 may comprise an input and output interface 800 configured to communicate with e.g. the gateway node 110, the PBX node 130, the first UE 121, the second UE 122 and with network nodes in the communications network 100.

The UE 120, 121, 122 is further configured to, e.g. by means of a sending unit 810 in the UE 120, 121, 122, when a call session has been established between the first UE 121 and the second UE 122 via the PBX node 130 and via the IMS network 102, send to the gateway node 110, a request for establishing a data channel to enhance the call session between the first UE 121 and the second UE 122.

The request to establish the data channel may be adapted to comprise one or more first parameters related to the requested data channel. The one or more first parameters may be adapted to be accepted by the first UE 121.

The UE 120, 121, 122 may further be configured to, e.g. by means of the sending unit 810 in the UE 120, 121, 122, send to the gateway node 130, a request to establish the first data channel between the first UE 121 and gateway node 110.

The UE 120, 121, 122 is further configured to, e.g. by means of a negotiating unit 820 in the UE 120, 121, 122, negotiate one or more parameters adapted to be used in the requested data channel.

The UE 120, 121, 122 may further be configured to, e.g. by means of the negotiating unit 820 in the UE 120, 121, 122, negotiate the one or more parameters adapted to be used in the requested data channel by: Receiving, from the gateway node 110, an accept message adapted to indicate that the second UE 122 accepts the request to establish the data channel. The accept message is adapted to comprises one or more parameters related to the requested data channel. The one or more parameters are adapted to be accepted by the second UE 122 based on the one or more first parameters adapted to be accepted by the first UE 121.

The UE 120, 121, 122 is further configured to, e.g. by means of an establishing unit 830 in the UE 120, 121, 122, establish the requested data channel to enhance the call session between the first UE 121 and the second UE 122, by using the negotiated one or more parameters.

The data channel between the first UE 121 and the second UE 122 is adapted to be represented by a peer-to-peer data channel adapted to bypass the PBX node 130.

The data channel to enhance the call session may be adapted to be established based on the one or more parameters.

The UE 120, 121, 122 may further be configured to, e.g. by means of the establishing unit 830 in the UE 120, 121, 122, establish the call session by receiving an indication from the gateway node 110. The indication is adapted to indicate that the second UE 122 has become available, and sending to the gateway node 110 a request to be connected to the second UE 122.

The established call session between the first UE 121 and the second UE 122 may be adapted to be based on the provided data.

The UE 120, 121, 122 may further be configured to, e.g. by means of an providing unit 840 in the UE 120, 121, 122, when the first data channel between the first UE 121 and the gateway node 130 has been established, provide data adapted to be related to the call session between the first UE 121 and the second UE 122. The data adapted to be related the call session is provided by using the first data channel.

The embodiments herein may be implemented through a respective processor or one or more processors, such as the processor 850 of a processing circuitry in the UE 120, 121, 122 depicted in FIG. 8a, together with respective computer program code for performing the functions and actions of the embodiments herein. The program code mentioned above may also be provided as a computer program product, for instance in the form of a data carrier carrying computer program code for performing the embodiments herein when being loaded into the UE 120, 121, 122. One such carrier may be in the form of a CD ROM disc. It is however feasible with other data carriers such as a memory stick. The computer program code may furthermore be provided as pure program code on a server and downloaded to the UE 120, 121, 122.

The gateway node 110 may further comprise a memory 860 comprising one or more memory units. The memory 860 comprises instructions executable by the processor 850 in the UE 120, 121, 122. The memory 860 is arranged to be used to store e.g. information, messages, indications, configurations, thresholds, timer values, reports, locations, tracking areas, timing advance values, communication data and applications to perform the methods herein when being executed in the UE 120, 121, 122.

In some embodiments, a computer program 870 comprises instructions, which when executed by the respective at least one processor 850, cause the at least one processor 850 of the UE 120, 121, 122 to perform the actions above.

In some embodiments, a respective carrier 880 comprises the respective computer program 870, wherein the carrier 880 is one of an electronic signal, an optical signal, an electromagnetic signal, a magnetic signal, an electric signal, a radio signal, a microwave signal, or a computer-readable storage medium.

Those skilled in the art will appreciate that the units in the UE 120, 121, 122 described above may refer to a combination of analog and digital circuits, and/or one or more processors configured with software and/or firmware, e.g. stored in the UE 120, 121, 122, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Further Extensions and Variations

Figure 9:
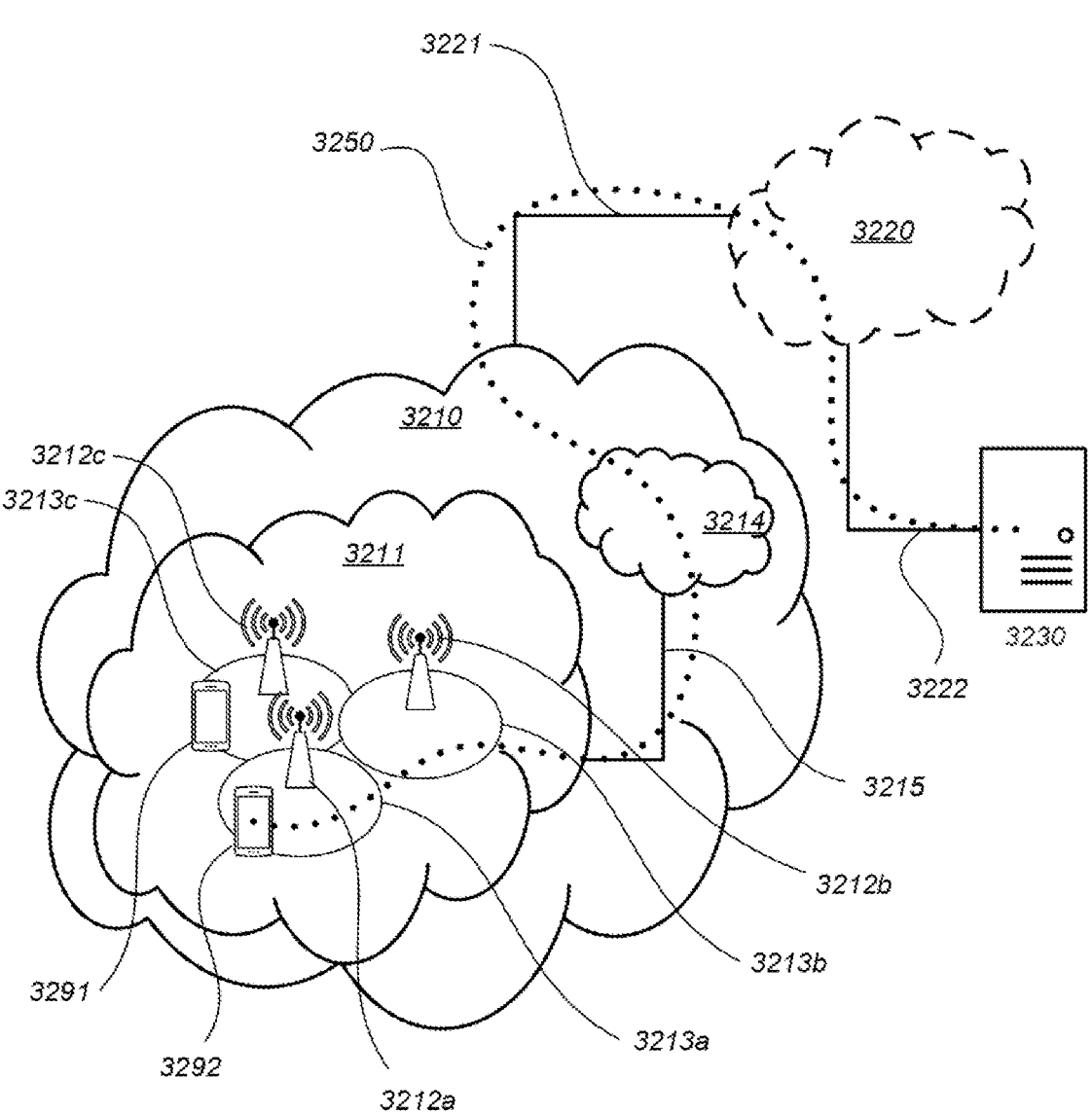
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 e.g. the gateway node 110, over a wired or wireless connection 3215. A first user equipment (UE) such as the UE 121 and/or a Non-AP STA 3291 located in coverage area 3213*c* is configured to wirelessly connect to, or be paged by, the corresponding base station 3212*c*. A second UE 3292 such as the second UE 122 and/or a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to setup and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to setup and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 10 may be identical to the host computer 3230, one of the base stations 3212*a*, 3212*b*, 3212*c* and one of the UEs 3291, 3292 of FIG. 9, respectively. This is to say, the inner workings of these entities may be as shown in FIG. 10 and independently, the surrounding network topology may be that of FIG. 9.

Figure 10:
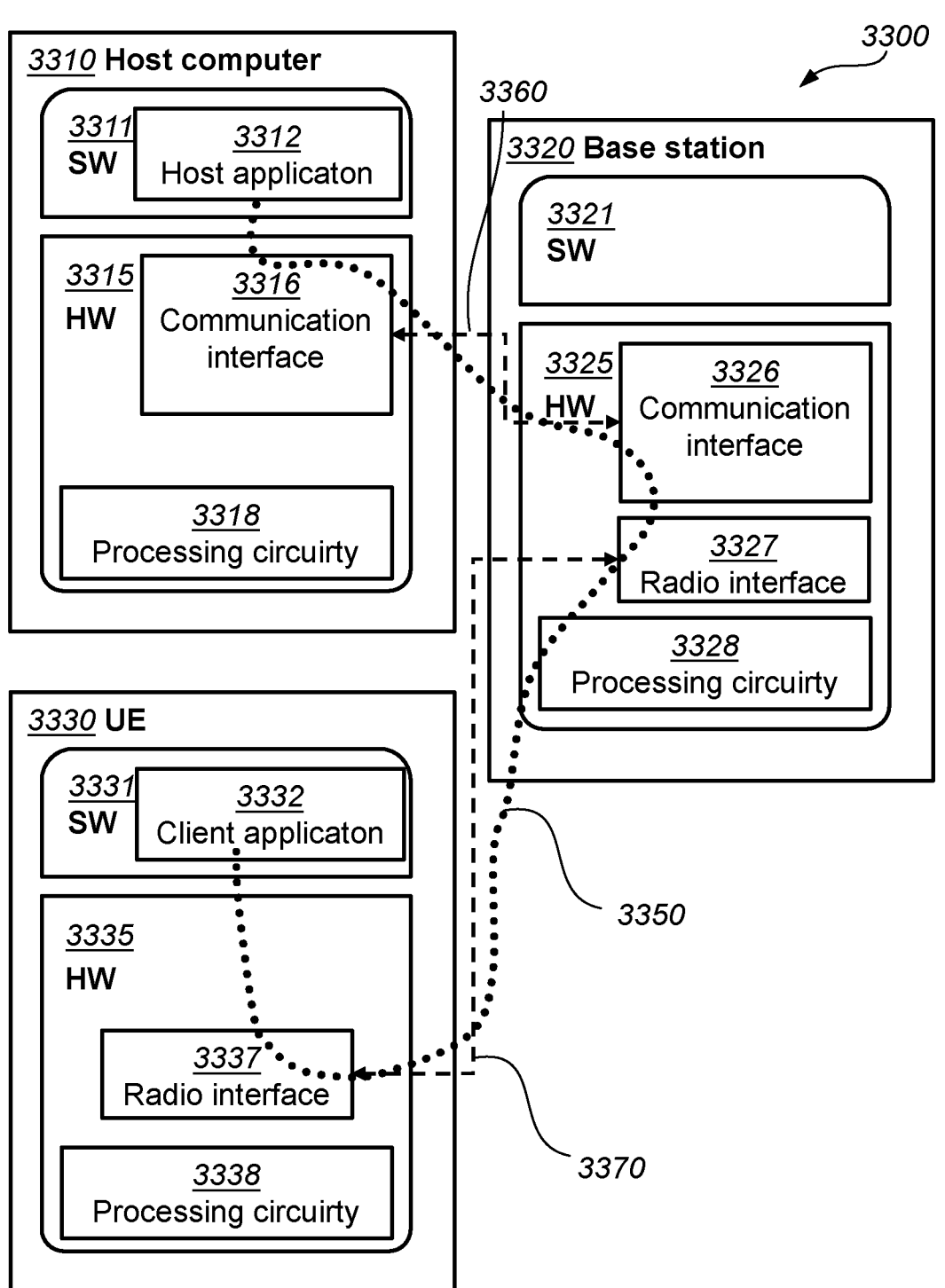
FIG. 10 is a generalized block diagram of a host computer communicating via a base station with a user equipment over a partially wireless connection.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 11, 12:
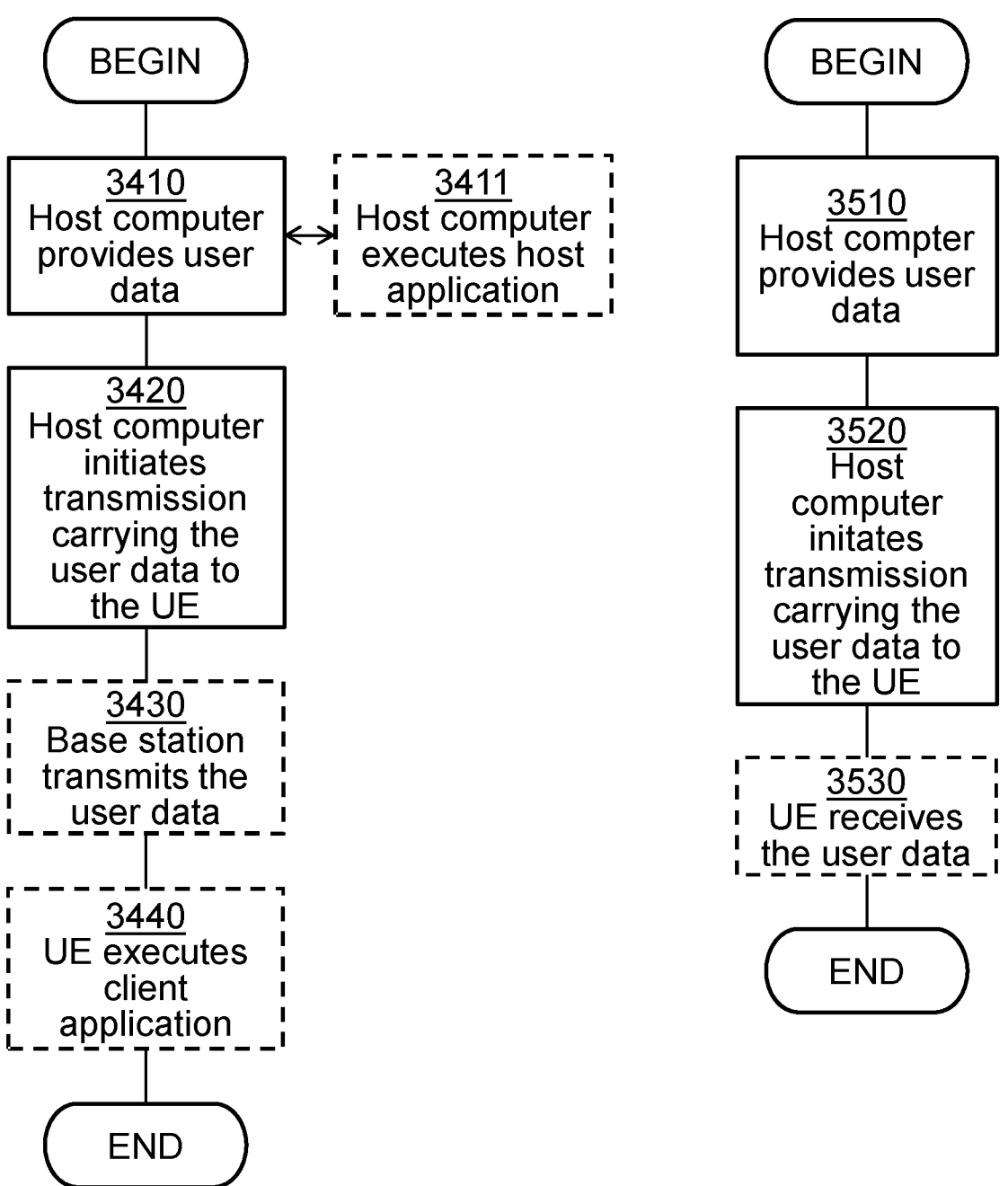
FIGS. 11 to 14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 13, 14:
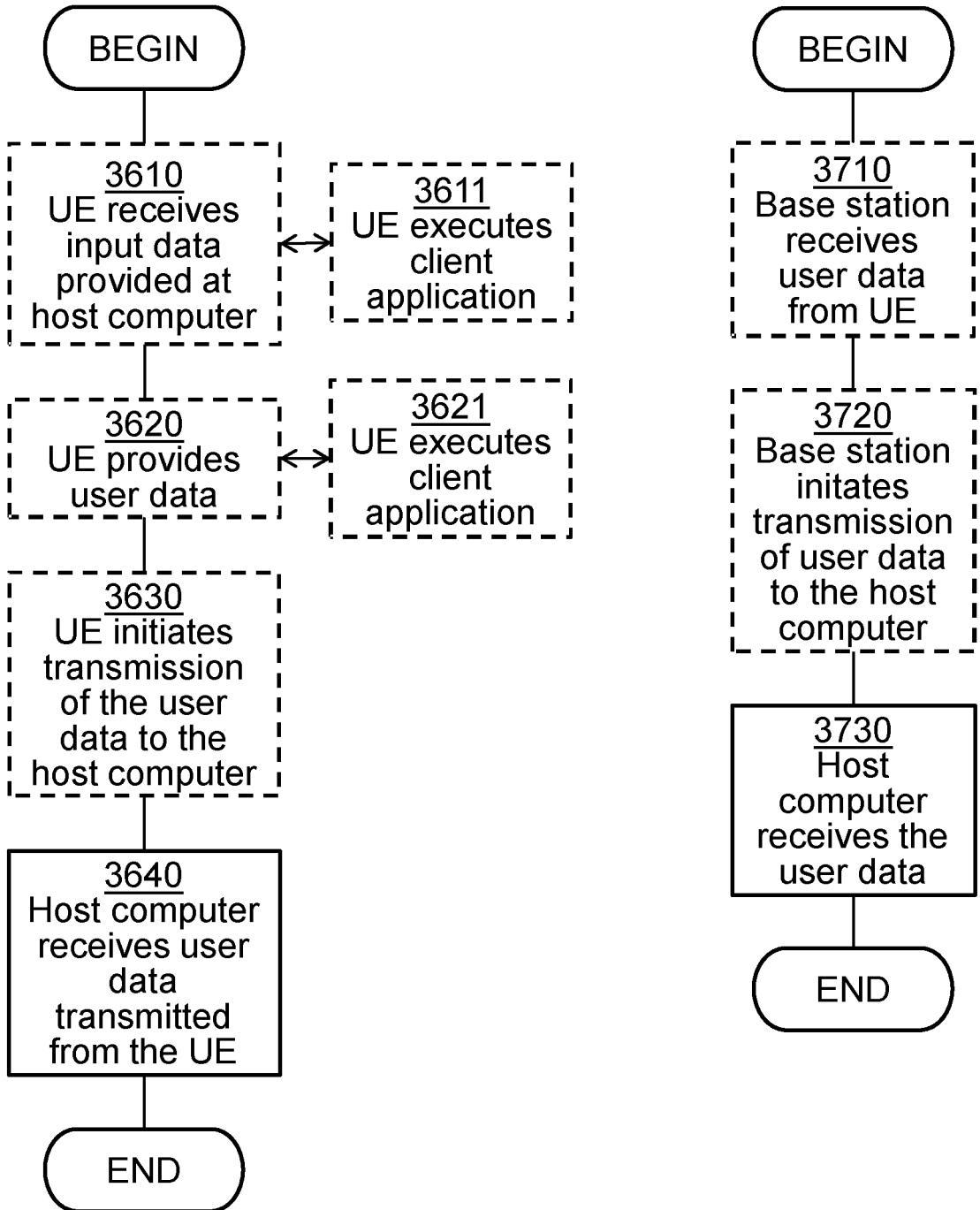

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 9 and FIG. 10. For simplicity of the present disclosure, only drawing references to FIG. 13 will be included in this section. In an optional first step 3610 of the method, the UE receives input data provided by the host computer. Additionally, or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 9 and FIG. 10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a gateway node for enhancing a call session between a first User Equipment, UE, and a second UE in a communications network, wherein the second UE is associated to a Private Branch Exchange, PBX, node, the method comprising:

after a call session has been established between the first UE and the second UE via the PBX node and via an Internet Protocol Multimedia Subsystem, IMS, network, receiving, from any one out of the first UE and the second UE, a request for establishing a data channel between the first UE and the second UE to enhance the call session, negotiating one or more parameters to be used in the requested data channel between the first UE and the second UE, and establishing the data channel according to the negotiation, to enhance the call session between the first UE and the second UE;

wherein the negotiating of the one or more parameters to be used in the requested data channel comprises:

sending, to the second UE, one or more first parameters related to the requested data channel, wherein the one or more first parameters are accepted by the first UE and are obtained from the received request for establishing the data channel, when receiving, from the second UE, one or more second parameters related to the requested data channel, wherein the one or more second parameters are accepted by the second UE based on the one or more first parameters accepted by the first UE, sending an accept message to the first UE, indicating that the second UE accepts the request to establish the data channel, wherein the accept message comprises the one or more second parameters, and wherein the data channel to enhance the call session is established based on the one or more parameters.

2. The method according to claim 1, wherein the data channel between the first UE and the second UE is represented by a peer-to-peer data channel bypassing the PBX node.

3. The method according to claim 1, wherein the gateway node has received a request for establishing the call session between the first UE and the second UE from the first UE, the method further comprising:

when receiving from the first UE, a request to establish a first data channel between the first UE and gateway node, establishing the first data channel between the first UE and the gateway node, obtaining data related to the call session between the first UE and the second UE using the first data channel, and wherein the established call session between the first UE and the second UE is based on the obtained data.

4. The method according to claim 1, wherein the gateway node has received a request to establish the call session between the first UE and the second UE from the first UE, the method further comprising:

upon the second UE becoming available, establishing the call session between the first UE and the second UE by instructing the PBX node to connect a first call session between the first UE and the PBX node with a second call session between the second UE and the PBX node.

5. The method according to claim 4, wherein the establishing of the call session further comprises indicating to the first UE that the second UE has become available, and wherein instructing the PBX node is performed when receiving a request from the first UE to be connected to the second UE.

6. A method performed by a User Equipment, UE, for enhancing a call session between a first UE and a second UE in a communications network, wherein the second UE is associated to a Private Branch Exchange, PBX, node, the method comprising:

after a call session has been established between the first UE and the second UE via the PBX node and via an Internet Protocol Multimedia Subsystem, IMS, network, sending to a gateway node, a request for establishing a data channel to enhance the call session between the first UE and the second UE, negotiating one or more parameters to be used in the requested data channel between the first UE and the second UE, and establishing the requested data channel to enhance the call session between the first UE and the second UE, using the negotiated one or more parameters;

wherein the UE is represented by any one out of the first UE and the second UE;

wherein the request to establish the data channel comprises one or more first parameters related to the requested data channel, wherein the one or more first parameters are accepted by the first UE, and wherein the negotiating of the one or more parameters to be used in the requested data channel comprises:

receiving, from the gateway node, an accept message, indicating that the second UE accepts the request to establish the data channel, wherein the accept message comprises one or more second parameters related to the requested data channel, wherein the one or more second parameters are accepted by the second UE based on the one or more first parameters accepted by the first UE, wherein the data channel to enhance the call session is established based on the one or more parameters.

7. The method according to claim 6, wherein the data channel between the first UE and the second UE is represented by a peer-to-peer data channel bypassing the PBX node.

8. The method according to claim 6, wherein the UE is represented by the first UE, the method further comprising:
   sending to the gateway node, a request to establish a first data channel between the first UE and the gateway node,
   when the first data channel between the first UE and the gateway node has been established, providing data related to the call session between the first UE and the second UE using the first data channel,
   wherein the established call session between the first UE and the second UE is based on the provided data.

9. The method according to claim 6, wherein the UE is represented by the first UE, and wherein the establishing of the call session comprises receiving an indication from the gateway node, the indication indicating that the second UE has become available, and sending to the gateway node, a request to be connected to the second UE.

10. A gateway node configured to enhance a call session between a first User Equipment, UE, and a second UE in a communications network, wherein the second UE is adapted to be associated to a Private Branch Exchange, PBX, node, the gateway node further being configured to:
   after a call session has been established between the first UE and the second UE via the PBX node and via an Internet Protocol Multimedia Subsystem, IMS, network, receive, from any one out of the first UE and the second UE, a request for establishing a data channel to enhance the call session,
   negotiate one or more parameters adapted to be used in the requested data channel between the first UE and the second UE, and
   establish the data channel according to the negotiation, to enhance the call session between the first UE and the second UE;
   wherein the gateway node is further configured to negotiate the one or more parameters adapted to be used in the requested data channel by:
   sending, via a connection established between the gateway node and the second UE, to the second UE one or more first parameters adapted to be related to the requested data channel, wherein the one or more first parameters are adapted to be accepted by the first UE and are adapted to be obtained from the received request for establishing the data channel,
   when receiving, from the second UE, one or more second parameters adapted to be related to the requested data channel, wherein the one or more second parameters are adapted to be accepted by the second UE based on the one or more first parameters adapted to be accepted by the first UE, send an accept message to the first UE, wherein the accept message is adapted to indicate that the second UE accepts the request to establish the data channel, wherein the accept message is adapted to comprise the one or more second parameters, and
   wherein the data channel to enhance the call session is adapted to be established based on the one or more parameters.

11. The gateway node according to claim 10, wherein the data channel between the first UE and the second UE is adapted to be represented by a peer-to-peer data channel adapted to bypass the PBX node.

12. The gateway node according to claim 10, wherein gateway node is further configured to receive a request to establish the call session between the first UE and the second UE, from the first UE, the gateway node further being configured to:
   when receiving from the first UE, a request to establish a first data channel between the first UE and gateway node, establish the first data channel between the first UE and the gateway node,
   obtain data adapted to be related to the call session between the first UE and the second UE by using the first data channel, and
   wherein the established call session between the first UE and the second UE is adapted to be based on the obtained data.

13. The gateway node according to claim 10, wherein gateway node is further configured to receive a request to establish the call session between the first UE and the second UE, from the first UE, the gateway node further being configured to:
   upon the second UE becoming available, establish the call session between the first UE and the second UE by instructing the PBX node to connect a first call session between the first UE and the PBX node with a second call session between the second UE and the PBX node.

14. The gateway node according to claim 13, further being configured to establish the call session by indicating to the first UE that the second UE has become available, and instruct the PBX node when receiving a request from the first UE to be connected to the second UE.

15. A User Equipment, UE, configured to enhance a call session between a first UE and a second UE in a communications network, wherein the second UE is adapted to be associated to a Private Branch Exchange, PBX, node, the UE further being configured to:
   after a call session has been established between the first UE and the second UE via the PBX node and via an Internet Protocol Multimedia Subsystem, IMS, network, send to a gateway node, a request for establishing a data channel to enhance the call session between the first UE and the second UE,
   negotiate one or more parameters adapted to be used in the requested data channel, and
   establish the requested data channel to enhance the call session between the first UE and the second UE, by using the negotiated one or more parameters;
   wherein the UE is represented by any one out of the first UE and the second UE;
   wherein the request to establish the data channel is adapted to comprise one or more first parameters related to the requested data channel, wherein the one or more first parameters are adapted to be accepted by the first UE, and wherein the UE further is configured to negotiate the one or more parameters adapted to be used in the requested data channel by:
   receiving, from the gateway node, an accept message adapted to indicate that the second UE accepts the request to establish the data channel, wherein the accept message is adapted to comprise one or more second parameters related to the requested data channel, wherein the one or more second parameters are adapted to be accepted by the second UE based on the one or more first parameters adapted to be accepted by the first UE,
   wherein the data channel to enhance the call session is adapted to be established based on the one or more parameters.

16. The UE according to claim 15, wherein the data channel between the first UE and the second UE is adapted to be represented by a peer-to-peer data channel adapted to bypass the PBX node.

17. The UE according to claim 15, wherein the UE is represented by the first UE, the UE further being configured to:

send to the gateway node, a request to establish a first data channel between the first UE and the gateway node, when the first data channel between the first UE and the gateway node has been established, provide data adapted to be related to the call session between the first UE and the second UE by using the first data channel, wherein the established call session between the first UE and the second UE is adapted to be based on the provided data.

18. The UE according to claim 15, wherein the UE is represented by the first UE, further being configured to establish the call session by receiving an indication from the gateway node, the indication adapted to indicate that the second UE has become available, and sending to the gateway node a request to be connected to the second UE.

\*    \*    \*    \*    \*